(12) United States Patent
Uchida et al.

(10) Patent No.: US 9,507,197 B2
(45) Date of Patent: Nov. 29, 2016

(54) LIGHTING DEVICE AND DISPLAY DEVICE

(75) Inventors: Tatsuo Uchida, Miyagi (JP); Takahiro Ishinabe, Miyagi (JP); Tohru Kawakami, Miyagi (JP); Kentaro Okuyama, Miyagi (JP); Mamoru Mizuno, Miyagi (JP)

(73) Assignees: Sony Corporation, Tokyo (JP); Tohoku University, Miyagi (JP)

(\*) Notice: Subject to any disclaimer, the term of this patent is extended or adjusted under 35 U.S.C. 154(b) by 1199 days.

(21) Appl. No.: 13/075,240

(22) Filed: Mar. 30, 2011

(65) Prior Publication Data

US 2011/0242146 A1    Oct. 6, 2011

(30) Foreign Application Priority Data

Apr. 6, 2010  (JP) ................................ 2010-088173

(51) Int. Cl.
| | |
|---|---|
| *G02F 1/1334* | (2006.01) |
| *F21V 8/00* | (2006.01) |
| *G02F 1/1343* | (2006.01) |
| *G02F 1/1347* | (2006.01) |
| *G02F 1/1335* | (2006.01) |

(52) U.S. Cl.
CPC .......... *G02F 1/1334* (2013.01); *G02B 6/0041* (2013.01); *G02F 1/13476* (2013.01); *G02F 1/134309* (2013.01); *G02F 1/133606* (2013.01); *G02F 1/133615* (2013.01)

(58) Field of Classification Search
CPC .................. G02B 6/0041; G02F 1/134309
See application file for complete search history.

(56) References Cited

U.S. PATENT DOCUMENTS

| | | | |
|---|---|---|---|
| 7,626,643 B2 | 12/2009 | Ijzerman et al. | |
| 8,493,526 B2 | 7/2013 | Uchida et al. | |
| 2002/0033909 A1\* | 3/2002 | Hiyama | G02B 6/0033 349/65 |
| 2005/0185131 A1 | 8/2005 | Miyachi et al. | |

(Continued)

FOREIGN PATENT DOCUMENTS

| | | |
|---|---|---|
| CN | 1928662 A | 3/2007 |
| JP | 03-119889 A | 5/1991 |

(Continued)

OTHER PUBLICATIONS

U.S. Appl. No. 13/075,247, filed Mar. 30, 2011, Uchida et al.

(Continued)

*Primary Examiner* — Anh Mai
*Assistant Examiner* — Zachary J Snyder
(74) *Attorney, Agent, or Firm* — Wolf, Greenfield & Sacks, P.C.

(57) ABSTRACT

A lighting device includes: a light guide plate; a light source; and a light modulation element disposed on a surface of or in the inside of the light guide plate, and adhered to the light guide plate. The light modulation element has a pair of transparent substrates, a first electrode provided on a surface of one of the transparent substrates, a second electrode provided on a surface of the other of the transparent substrates, and a light modulation layer, provided in a gap between the transparent substrates, exhibiting a light-scattering property or a light-transmitting property concerning light from the light source depending on intensity of an electric field. One or both of the first and second electrodes include partial electrodes. First partial electrodes of the partial electrodes are adjacent to second partial electrodes of the partial electrodes, and have irregular shapes on edges adjacent to the second partial electrodes.

20 Claims, 19 Drawing Sheets

(56) References Cited

U.S. PATENT DOCUMENTS

| | | | |
|---|---|---|---|
| 2005/0264730 A1* | 12/2005 | Kataoka | G02F 1/133555 349/114 |
| 2007/0069974 A1 | 3/2007 | Kawata et al. | |
| 2007/0091638 A1 | 4/2007 | Ijzerman et al. | |
| 2007/0097290 A1 | 5/2007 | Mimura et al. | |
| 2007/0236629 A1* | 10/2007 | Wu | G02F 1/133555 349/96 |
| 2008/0100784 A1* | 5/2008 | Haruyama | G02F 1/1395 349/114 |
| 2008/0303997 A1* | 12/2008 | Takeda | G02F 1/133707 349/129 |
| 2009/0033821 A1* | 2/2009 | Lee | G02F 1/134309 349/48 |
| 2009/0091815 A1 | 4/2009 | Shiu et al. | |
| 2009/0284693 A1* | 11/2009 | Adachi | G02F 1/133555 349/98 |
| 2010/0110318 A1* | 5/2010 | Ogawa | G02F 1/133371 349/33 |
| 2010/0171903 A1* | 7/2010 | Okuyama | G02B 6/0041 349/65 |
| 2010/0177268 A1* | 7/2010 | Nakanishi | 349/114 |
| 2011/0043715 A1* | 2/2011 | Ohyama | G02B 27/2214 349/15 |
| 2011/0169877 A1* | 7/2011 | Ishida | G02F 1/1334 345/690 |
| 2012/0069063 A1 | 3/2012 | Sato et al. | |

FOREIGN PATENT DOCUMENTS

| | | |
|---|---|---|
| JP | 06-347790 | 12/1994 |
| JP | 11-285030 A | 10/1999 |
| JP | 2004/206916 A | 7/2004 |
| JP | 2007-057925 A | 3/2007 |
| JP | 2007-094038 A | 4/2007 |
| JP | 2007-514273 A | 5/2007 |
| WO | WO 2008029547 A1 * | 3/2008 |

OTHER PUBLICATIONS

U.S. Appl. No. 13/322,014, filed Nov. 22, 2011, Sato et al.

* cited by examiner

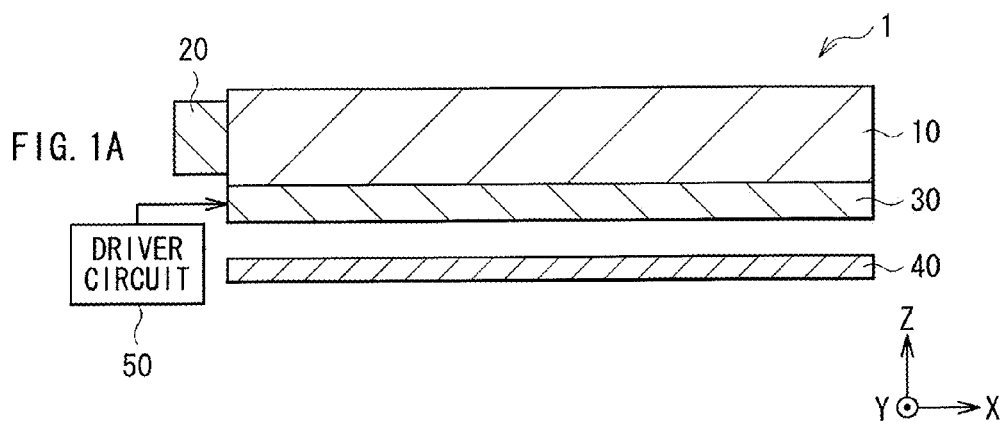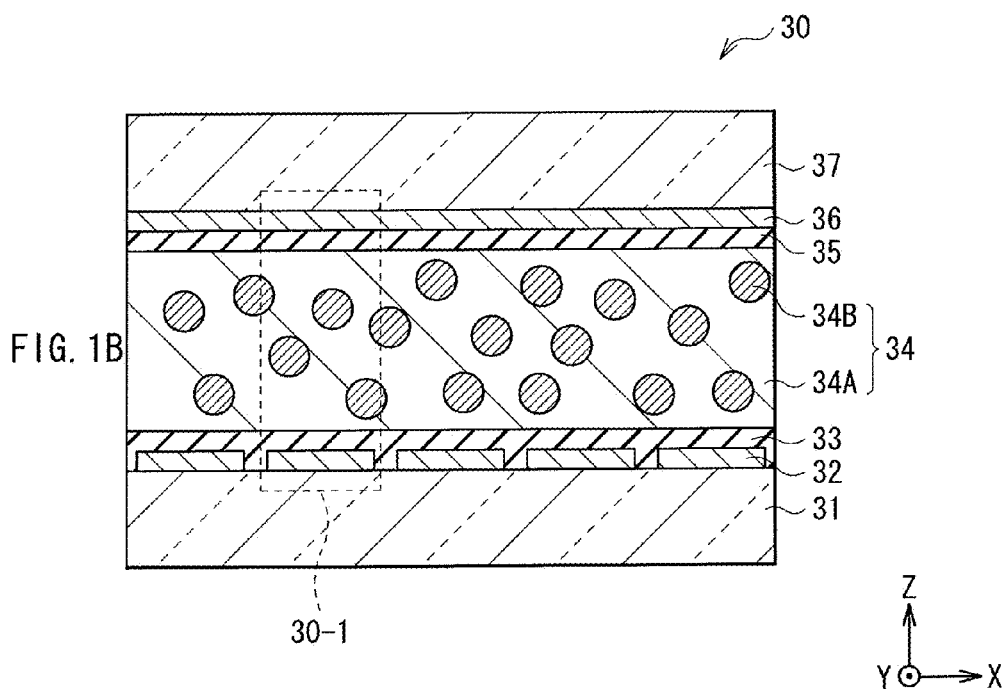

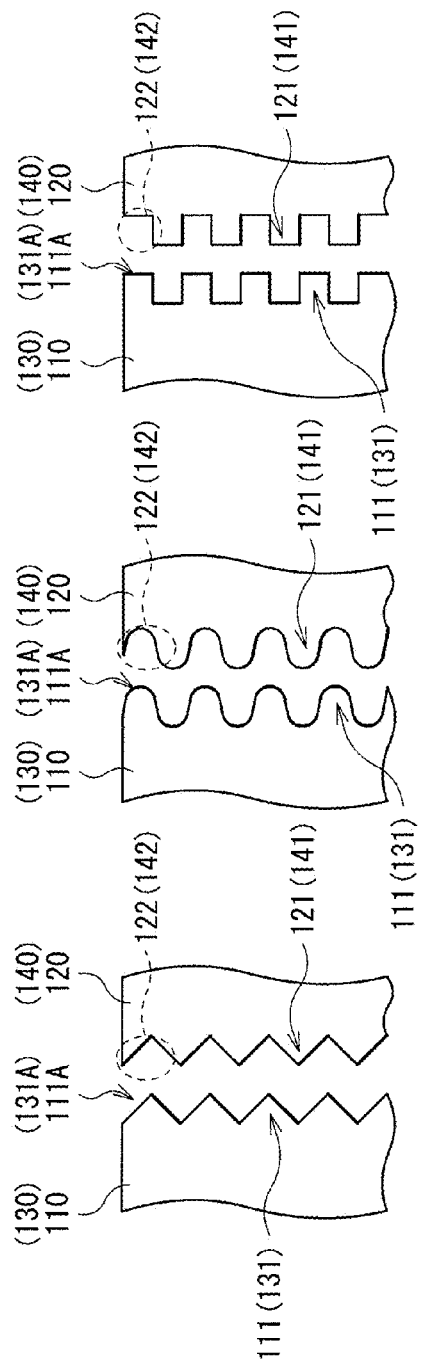
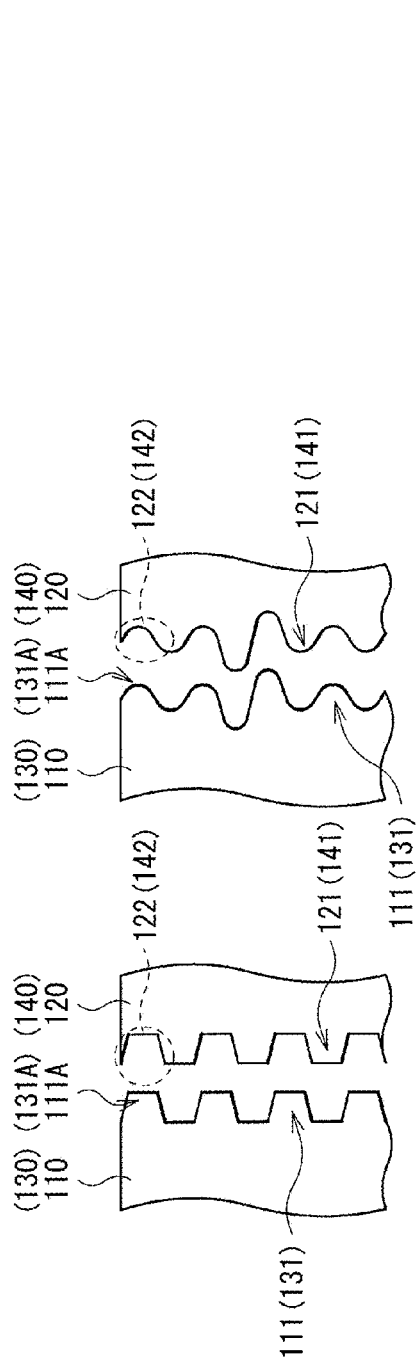

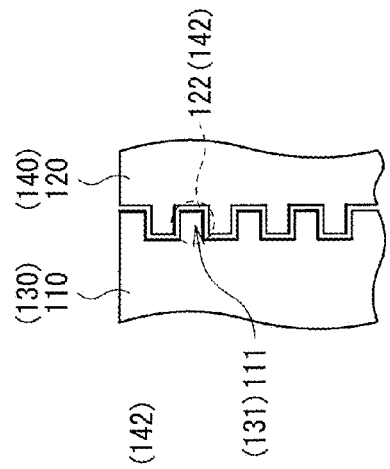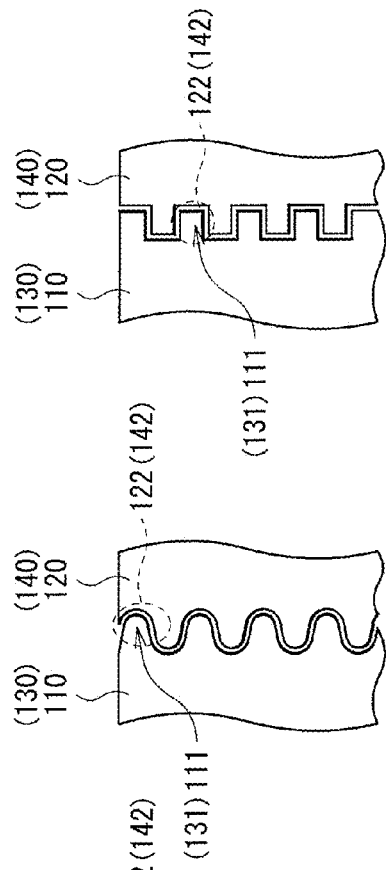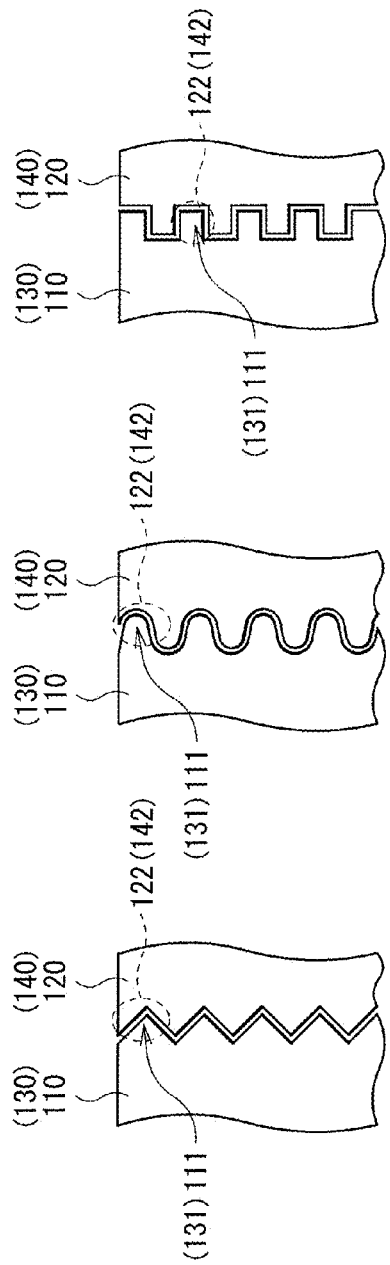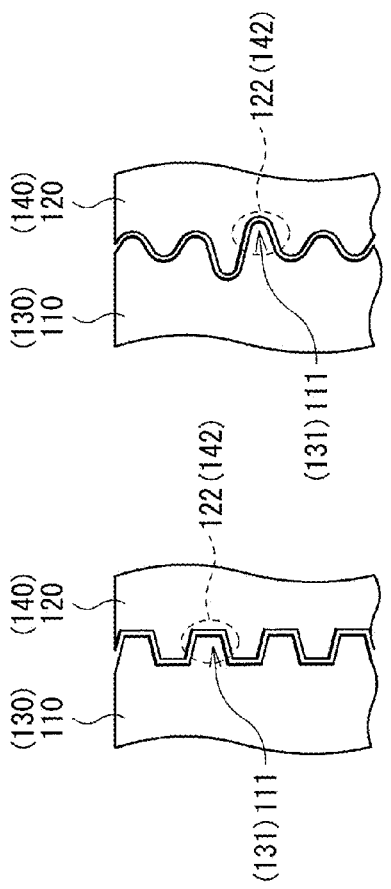

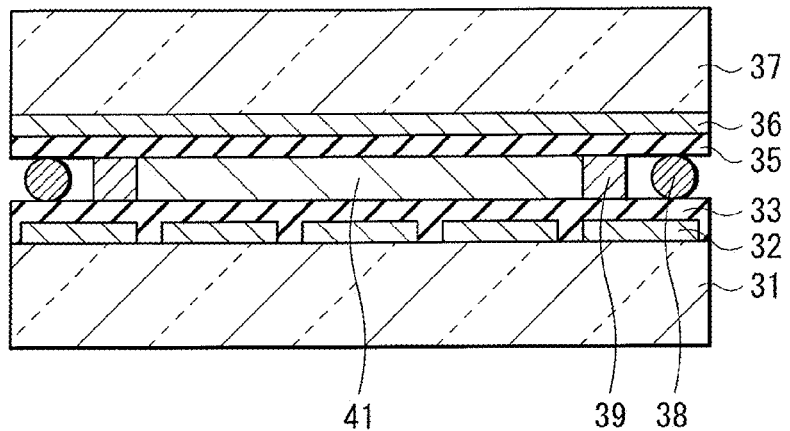
FIG. 12A
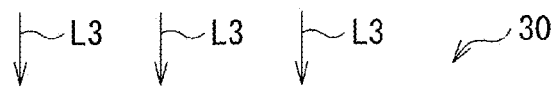
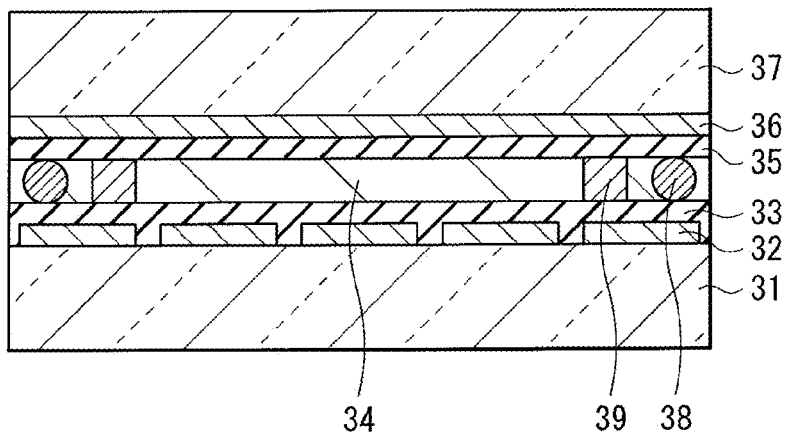
FIG. 12B
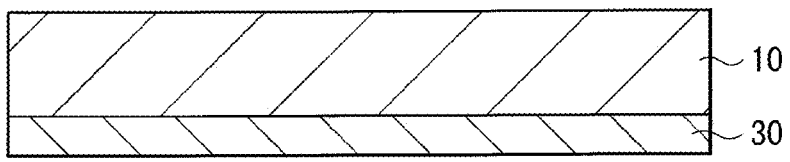
FIG. 12C

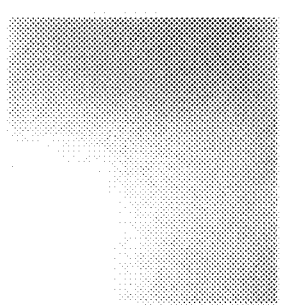
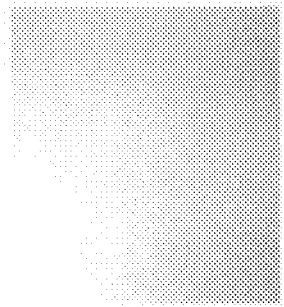
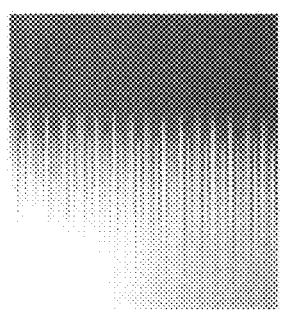
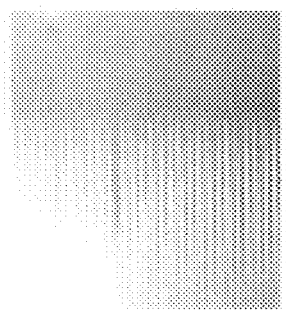
FIG. 24D
FIG. 24E
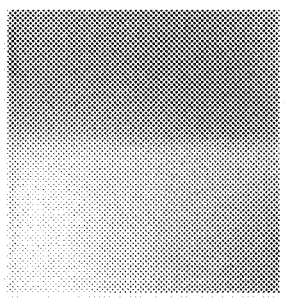
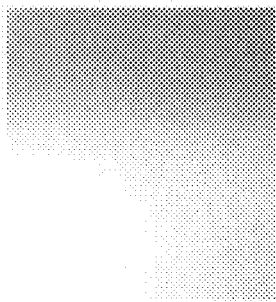
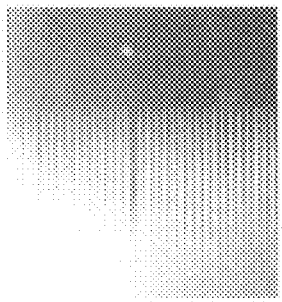
FIG. 24A
FIG. 24B
FIG. 24C

LIGHTING DEVICE AND DISPLAY DEVICE

CROSS REFERENCE TO RELATED APPLICATIONS

The present application claims priority under 35 U.S.C. §119 to Japanese Patent Application No. JP 2010-088173, filed in the Japan Patent Office on Apr. 6, 2010, the entire content of which is incorporated herein by reference.

BACKGROUND OF THE INVENTION

Field of the Invention

The present invention relates to a lighting device and a display device, each device having a light modulation element exhibiting a light-scattering property or a light-transmitting property.

Description of Related Art

Recently, a liquid crystal display has been rapidly improved in image quality or advanced in energy saving. In a proposed method, scotopic contrast is improved by partially modulating intensity of light from a backlight. In the method, principally, light emitting diodes (LEDs), which are used for a light source of a backlight, are partially driven to modulate illumination light in accordance with a display image. In addition, a large-size liquid crystal display has been increasingly demanded to be reduced in thickness as in a small-size liquid crystal display. Therefore, attention is being focused on an edge-light-type backlight, where a light source is disposed on an edge of a light guide plate, rather than a type where a cold cathode fluorescent lamp (CCFL) or LEDs is/are disposed directly under a liquid crystal panel. However, in the edge-light-type backlight, it is hard to achieve partial drive where light intensity of a light source is partially modulated.

SUMMARY OF THE INVENTION

As a method to extract light propagating within a light guide plate, for example, Japanese Unexamined Patent Publication No. 6-347790 proposes a display device using a polymer dispersed liquid crystal (PDLC) that is switchable between transparent and scattering states. In the proposed technique, which is intended to prevent mirroring, voltage is partially applied to PDLC to switch a state between transparent and scattering states. However, in the technique, when light is guided and partially extracted to partially modulate illumination light, if luminance is greatly different in a boundary portion caused by a pattern of electrodes for driving PDLC, the boundary portion has been inconveniently observed.

A technique to blur a boundary portion between light and dark regions is disclosed in, for example, Japanese Unexamined Patent Publication No. 2004-2069116. In the technique, a diffuser plate is used or a spatial distance is increased to blur difference in brightness in the boundary portion. However, when the technique is applied to a lighting device using PDLC, the lighting device is inconveniently hard to be reduced in thickness.

It is desirable to provide a lighting device and a display device, in which a brightness boundary portion of illumination light may be blurred without disturbing reduction in thickness.

A lighting device according to an embodiment of the invention includes a light guide plate, a light source disposed on a side face of the light guide plate, and a light modulation element disposed on a surface of or in the inside of the light guide plate and adhered to the light guide plate. The light modulation element has a pair of transparent substrates disposed separately and oppositely, a first electrode provided on a surface of one of the pair of transparent substrates, and a second electrode provided on a surface of the other of the pair of transparent substrates. The light modulation element further has a light modulation layer, provided in a gap between the pair of transparent substrates, exhibiting a light-scattering property or a light-transmitting property with respect to light from the light source depending on intensity of an electric field. One or both of the first electrode and the second electrode includes a plurality of partial electrodes. First partial electrodes of the plurality of partial electrodes are adjacent to second partial electrodes of the plurality of partial electrodes, and have irregular shapes on edges adjacent to the second partial electrodes.

A display device according to an embodiment of the invention includes a display panel having a plurality of pixels arranged in a matrix, the pixels being driven based on an image signal, and a lighting device lighting the display panel. The lighting device mounted on the display device has the same components as the above lighting device.

In the lighting device and the display device according to the embodiments of the invention, the light modulation layer, which exhibits a light-scattering property or a light-transmitting property with respect to light from the light source depending on intensity of an electric field, is provided in the light modulation element adhered to the light guide plate. Consequently, light propagating within the light guide plate may be partially extracted. Moreover, in the embodiments of the invention, one or both of the first electrode and the second electrode provided in the light modulation element includes a plurality of partial electrodes, and first partial electrodes of the plurality of partial electrodes are adjacent to second partial electrodes of the plurality of partial electrodes, and have irregular shapes on edges adjacent to the second partial electrodes. This reduces clearness of a boundary between light-transmitting and light-scattering regions.

In the embodiments of the invention, the irregular shape of the first partial electrode is preferably a zigzag shape, a waveform shape, a trapezoidal shape, a ramp shape or a random shape. When the irregular shape of the first partial electrode is a zigzag shape with a plurality of first convex portions, having acute ends, being arranged, one or more of profiles of the first convex portions is preferably roughly a function of the power of m of the sine (m is an even number such as 2, 4 or 6) with an end as an origin. In the embodiments of the invention, the second partial electrodes preferably have irregular shapes on edges adjacent to the first partial electrodes. When the irregular shape of the second partial electrode is a zigzag shape with a plurality of second convex portions, having acute ends, being arranged, one or more of profiles of the second convex portions is preferably roughly a function of the power of m of the sine with an end as an origin. In the embodiments of the invention, preferably, the plurality of partial electrodes are arranged in a matrix, and each partial electrode has an irregular shape on an edge adjacent to another partial electrode.

In the embodiments of the invention, in the case that both the first and second partial electrodes have irregular shapes, and the irregular shape of each first partial electrode is made up of a plurality of first convex portions arranged along an edge, and the irregular shape of each second partial electrode is made up of a plurality of second convex portions arranged along an edge, the plurality of first convex portions and the plurality of second convex portions are preferably alternately arranged. In the embodiments of the invention, in the case that both the first and second partial electrodes have irregular shapes, ends of one or both of the first convex portions and the second convex portions are preferably unevenly, alternately or randomly arranged.

According to the lighting device and the display device of the embodiments of the invention, since clearness of a boundary between light-transmitting and light-scattering regions of the light modulation element is reduced, when light is partially extracted from the light guide plate, clearness of a boundary between dark and light regions may be reduced. As a result, a brightness boundary portion of illumination light may be blurred. In the embodiments of the invention, since an electrode pattern in the light modulation element is simply devised to blur a brightness boundary portion of illumination light, and thus a diffuser plate need not be added, reduction in thickness is not disturbed. Therefore, in the embodiments of the invention, a brightness boundary portion of illumination light may be blurred without disturbing reduction in thickness.

In the lighting device and the display device according to the embodiments of the invention, when the irregular shape of the first partial electrode is a zigzag shape with a plurality of first convex portions, having acute ends, being arranged, and one or more of profiles of the first convex portions is roughly a function of the power of m of the sine with an end as an origin, electrode area of the first partial electrode is gradually changed near the ends of the first convex portions. Consequently, clearness of a boundary between light-transmitting and light-scattering regions is more reduced, and therefore when light is partially extracted from the light guide plate, clearness of a boundary between dark and light regions may be more reduced. As a result, a brightness boundary portion of illumination light may be more blurred.

Other and further objects, features and advantages of the invention will appear more fully from the following description.

BRIEF DESCRIPTION OF THE DRAWINGS

FIGS. 1A and 1B are section diagrams showing an example of a configuration of a backlight according to an embodiment of the invention.

FIGS. 3A to 3E are plan diagrams showing an example of edges of the electrodes in FIG. 1B.

FIGS. 4A to 4E are plan diagrams showing another example of edges of the electrodes in FIG. 1B.

FIGS. 12A to 12C are section diagrams for illustrating the manufacturing process following FIG. 11C.

FIGS. 24A to 24E are diagrams showing luminance distribution of the backlights according to the examples and the comparative example.

DETAILED DESCRIPTION OF THE PREFERRED EMBODIMENTS

Figure 2:
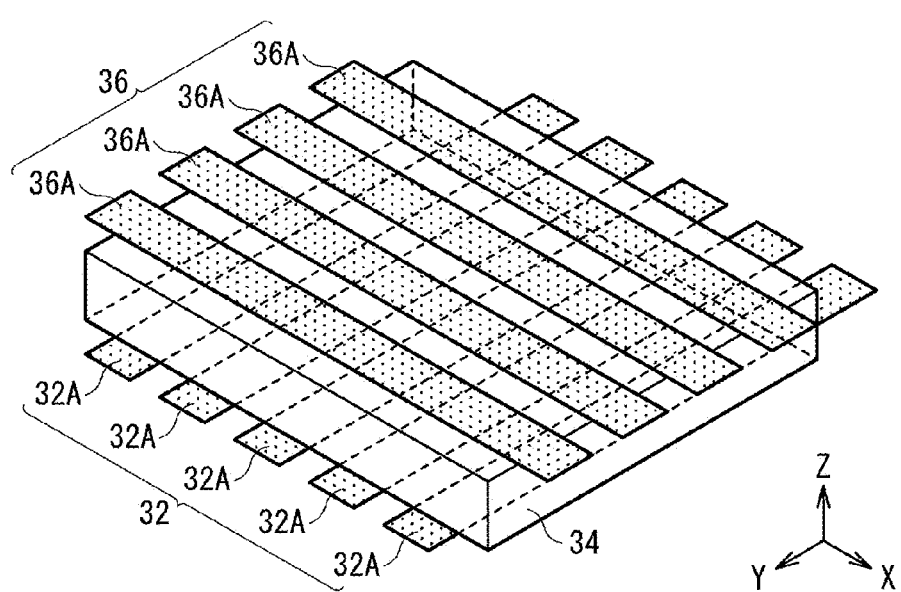
FIG. 2 is a perspective diagram showing an example of a configuration of electrodes in FIG. 1B.

Hereinafter, a preferred embodiment of the invention will be described in detail with reference to drawings. Description is made in the following sequence.

1. Embodiment
Backlight, light modulation element (vertical alignment PDLC)
2. Modifications
Electrode pattern, light modulation element (horizontal alignment PDLC)
Position of light modulation element, addition of optical sheet
3. Application example
Display device
4. Examples
Backlight Embodiment FIG. 1A shows an example of a sectional configuration of a backlight 1 (lighting device) according to an embodiment of the invention. FIG. 1B shows an example of a sectional configuration of a light modulation element 30 in FIG. 1A. FIGS. 1A and 1B are schematic diagrams and therefore dimensions or shapes are not necessarily the same as actual ones. The backlight 1, for example, lights a liquid crystal display panel from the back, and includes a light guide plate 10, a light source 20 disposed on a side face of the light guide plate 10, a light modulation element 30 and a reflective plate 40 disposed behind the light guide plate 10, and a driver circuit 50 driving the light modulation element 30.

The light guide plate 10 guides light from the light source 20, disposed on the side face of the light guide plate 10, to a top of the light guide plate 10. The light guide plate 10 has a shape in correspondence to a display panel (not shown) disposed on the top of the light guide plate 10, for example, a rectangular shape enclosed by a top, a bottom and side faces. Hereinafter, among side faces of the light guide plate 10, a side face, through which light enters from the light source 20, is called light incidence surface 10A. The light guide plate 10 has, for example, a predetermined, patterned shape on one or both of the top and the bottom so as to have a function of scattering and equalizing light entering through the light incidence surface 10A. When voltage applied to the backlight 1 is modulated to equalize luminance, a non-patterned, flat light guide plate may be used as the light guide plate 10. For example, the light guide plate 10 acts even as a support supporting an optical sheet (for example, a diffuser plate, a diffuser sheet, a lens film or a polarization separation sheet) disposed between the display panel and the backlight 1. For example, the light guide plate 10 mainly includes transparent thermoplastic resin such as polycarbonate resin (PC) or acrylic resin (polymethyl methacrylate (PMMA)).

The light source 20 is a linear light source, and includes, for example, a hot cathode fluorescent lamp (HCFL), CCFL or a plurality of LEDs arranged in a line. When the light source 20 includes a plurality of LEDs, all the LEDs are preferably white LEDs from the viewpoint of efficiency, reduction in thickness and uniformity. The light source 20 may include, for example, red LED, green LED and blue LED. The light source 20 may be provided on only one side face of the light guide plate 10 as shown in FIG. 1A, or may be provided on two, three or all side faces of the light guide plate 10.

The reflective plate 40 returns light, leaking from the back of the light guide plate 10 through the light modulation element 30, to the light guide plate 10, and has capabilities of, for example, reflecting, diffusing and scattering the light. Consequently, light emitted from the light source 20 may be efficiently used, and besides front luminance is increased. The reflective plate 40 includes, for example, PET (polyethylene terephthalate) foam, a silver-deposited film, a multilayer reflected-film or white PET.

In the embodiment, the light modulation element 30 is adhered to the back (bottom) of the light guide plate 10 with no air layer in between, and, for example, attached to the back of the light guide plate 10 via an adhesive (not shown). The light modulation element 30 includes, for example, a transparent substrate 31, a lower electrode 32, an alignment film 33, a light modulation layer 34, an alignment film 35, an upper electrode 36 and a transparent substrate 37 disposed in this order from a reflective plate 40 side, as shown in FIG. 1B.

The transparent substrate 31 or 37 supports the light modulation layer 34, and typically includes a substrate transparent to visible light, for example, a glass plate or a plastic film. The lower electrode 32 is provided on a surface facing the transparent substrate 37 of the transparent substrate 31, and includes, for example, a plurality of belt-like partial electrodes 32A, extending in one direction in a plane, arranged in parallel as shown in FIG. 2 partially showing the light modulation element 30. The upper electrode 36 is provided on a surface facing the transparent substrate 31 of the transparent substrate 37, and includes, for example, a plurality of belt-like partial electrodes 36A arranged in parallel, the partial electrodes extending in one direction in a plane corresponding to a direction intersecting with (perpendicular to) the extending direction of the lower electrode 32 as shown in FIG. 2. While edges of the lower electrode 32 and of the upper electrode 36 are linear in FIG. 2, the edges are actually nonlinear as described later.

The lower electrode 32 and the upper electrode 36 have patterns in connection with drive methods, respectively. For example, when the electrode includes belt-like partial electrodes arranged in parallel as above, the partial electrodes may be driven by simple matrix drive. When one electrode is in a form of a solid film (film formed on the whole surface), and the other electrode is patterned in a matrix, the partial electrodes may be driven by, for example, active matrix drive. When one electrode is in a form of a solid film, and the other electrode is patterned in blocks having thin lead lines, for example, segment type drive may be used to allow each divided block to be independently driven.

Each of edges of the lower electrode 32 and the upper electrode 36 has a nonlinear shape. For example, one partial electrode 32A (first partial electrode 110) of the plurality of partial electrodes 32A is adjacent to one or more partial electrodes 32A (second partial electrode 120) of the plurality of partial electrodes 32A, and has an irregular shape on an edge adjacent to the second partial electrode 120. Furthermore, for example, one partial electrode 36A (first partial electrode 130) of the plurality of partial electrodes 36A is adjacent to one or more partial electrodes 36A (second partial electrode 140) of the plurality of partial electrodes 36A, and has an irregular shape on an edge adjacent to the second partial electrode 140. Each of the irregular shapes is, for example, a zigzag shape, a waveform shape, a ramp shape, a trapezoidal shape or a random shape, as shown in FIGS. 3A to 3E. In FIGS. 3A to 3E, 110 (130) means 110 or 130, which is similar in other symbols.

The irregular shape of the first partial electrode 110 is made up of a plurality of first convex portions 111 arranged along an edge, and the irregular shape of the second partial electrode 120 is made up of a plurality of second convex portions 121 arranged along an edge. The first convex portions 111 and the second convex portions 121 are alternately disposed, for example, as shown in FIGS. 3A to 3E. Similarly, the irregular shape of the first partial electrode 130 is made up of a plurality of first convex portions 131 arranged along an edge, and the irregular shape of the second partial electrode 140 is made up of a plurality of second convex portions 141 arranged along an edge. The first convex portions 131 and the second convex portions 141 are alternately disposed, for example, as shown in FIGS. 3A to 3E.

Width of a gap (slit portion) between an edge having the irregular shape of the first partial electrode 110 and an edge having the irregular shape of the second partial electrode 120 is equal to or lower than a predetermined size. Similarly, width of a gap (slit portion) between an edge having the irregular shape of the first partial electrode 130 and an edge having the irregular shape of the second partial electrode 140 is equal to or lower than a predetermined size. An end 111A of each first convex portion 111 is disposed outside a concave portion 122 formed between adjacent two second convex portions 121, for example, as shown in FIGS. 3A to 3E. Similarly, an end 131A of each first convex portion 131 is disposed outside a concave portion 142 formed between adjacent two second convex portions 141, for example, as shown in FIGS. 3A to 3E. The end 111A of each first convex portion 111 may be disposed inside the concave portion 122, for example, as shown in FIGS. 4A to 4E. Similarly, the end 131A of each first convex portion 131 may be disposed inside the concave portion 142 formed between adjacent two second convex portions 141, for example, as shown in FIGS. 4A to 4E. In a layout shown in FIGS. 4A to 4E, width of the slit portion may be narrowed compared with a layout shown in FIGS. 3A to 3E. While the width of the slit portion is preferably as narrow as possible, too narrow width rather means little in the light of a blur characteristic described later. Therefore, for example, in the case that a 42-inch display is divided into 12*6, when a span of the partial electrodes 32A or 36A is about 80 mm, width of the slit portion is preferably about 10 to 500 μm.

Figure 5:
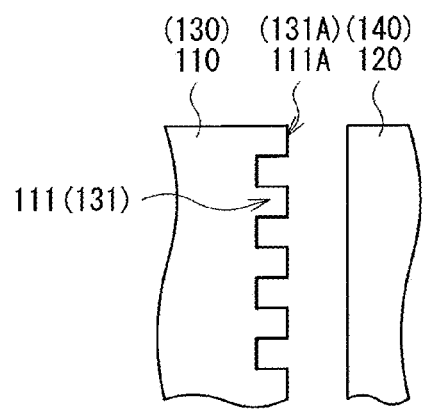
FIG. 5 is a plan diagram showing another example of edges of the electrodes of FIG. 1B.

Both the lower and upper electrodes 32 and 36 need not necessarily have nonlinear edges, and one of the lower and upper electrodes 32 and 36 may have a nonlinear edge while the other has a linear edge. In addition, both the first and second partial electrodes 110 and 120 need not necessarily have the irregular shapes, and an edge of one of the first and second partial electrodes 110 and 120 may have the irregular shape while an edge of the other has a linear shape, for example, as shown in FIG. 5. Similarly, both the first and second partial electrodes 130 and 140 need not necessarily have the irregular shapes, and an edge of one of the first and second partial electrodes 130 and 140 may have the irregular shape while an edge of the other has a linear shape, for example, as shown in FIG. 5. In the case that the plurality of partial electrodes 32A are arranged in a matrix, each partial electrode 32A may have the irregular shape on each of edges adjacent to other partial electrodes 32A, or on part of edges adjacent to other partial electrodes 32A.

Figure 6:
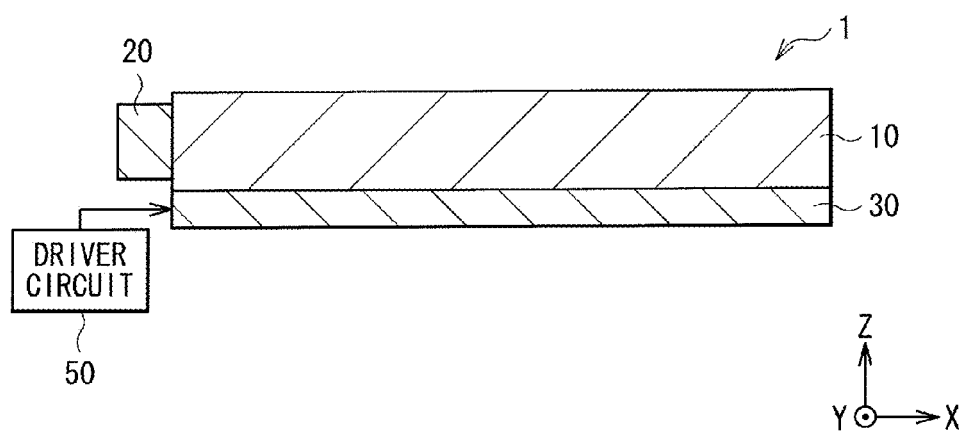
FIG. 6 is a section diagram showing another example of a configuration of the backlight of FIG. 1A.

At least the upper electrode 36 (electrode on a top side of the backlight 1) of the lower and upper electrodes 32 and 36 includes a transparent conductive material, for example, indium-tin oxide (ITO), indium-zinc oxide (IZO) or zinc oxide (ZnO). However, the lower electrode 32 (electrode on a bottom side of the backlight 1) need not include a transparent material, and, for example, may include metal. In the case that the lower electrode 32 include metal, the lower electrode further has a function of reflecting light entering the light modulation element 30 from the back of the light guide plate 10 like the reflective plate 40. In this case, for example, the reflective plate 40 may not be provided as shown in FIG. 6.

Portions corresponding to regions, at which the lower electrode 32 faces the upper electrode 36 when the electrodes 32 and 36 are viewed in a normal direction of the light modulation element 30, configure respective light modulation cells 30-1. Each light modulation cell 30-1 may be independently driven by applying a predetermined voltage between the lower electrode 32 and the upper electrode 36, and exhibits a light-transmitting property or a light-scattering property with respect to light from the light source 20 depending on a voltage value applied between the lower electrode 32 and the upper electrode 36. The light-transmitting property and the light-scattering property are described in detail in description of the light modulation layer 34.

For example, the alignment film 33 or 35 aligns a liquid crystal or a monomer used for the light modulation layer 34. Types of the alignment film include, for example, a vertical alignment film and a horizontal alignment film, and the vertical alignment film is used for the alignment film 33 or 35 in the embodiment. For the vertical alignment film, a silane coupling agent, polyvinyl alcohol (PVA), a polyimide-series material, a surfactant or the like may be used. When a plastic film is used for the transparent substrate 31 or 37, since baking temperature is preferably low to the utmost after the alignment film 33 or 35 is coated on the transparent substrate 31 or 37 in a manufacturing process, the silane coupling agent is preferably used for the alignment film 33 or 35 because alcohol-based solvents may be used. In addition, rubbing treatment is preferably performed for pre-tilt described later to the vertical alignment film, as well as the horizontal alignment film.

Each of the vertical and horizontal alignment films is adequate enough to have a function of aligning the liquid crystal and the monomer, and need not have reliability against repeated voltage application though the reliability is demanded for a typical liquid crystal display. This is because reliability of a produced device against voltage application largely depends on an interface between a polymerized product of a monomer and a liquid crystal. Even if the alignment film is not used, the liquid crystal and the monomer used for the light modulation layer 34 may be aligned, for example, by applying an electric field or a magnetic field between the lower electrode 32 and the upper electrode 36. In other words, while an electric field or a magnetic field is applied between the lower electrode 32 and the upper electrode 36, an alignment state of the liquid crystal or the monomer under voltage application may be fixed through ultraviolet irradiation. When voltage is used to form the alignment film, electrodes are separately formed for each of alignment and drive, a two-frequency liquid crystal may be used as a liquid crystal material since a sign of dielectric anisotropy is reversed depending on frequencies. When a magnetic field is used to form the alignment film, a material having large magnetic-susceptibility anisotropy is preferably used for the alignment film, and, for example, a material having many benzene rings is preferably used.

The light modulation layer 34 is, for example, a composite layer including a bulk 34A and a plurality of fine particles 34B dispersed in the bulk 34A as shown in FIG. 1B. The bulk 34A and the fine particles 34B have optical anisotropy each.

Figure 7A:
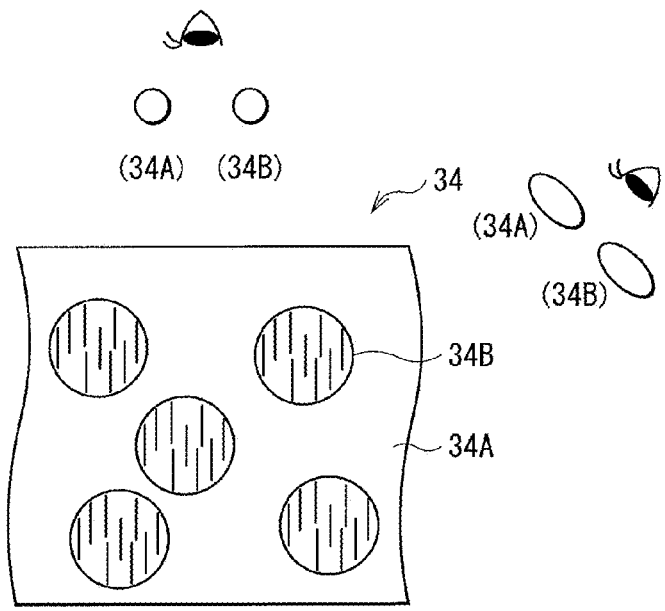
FIGS. 7A to 7C are schematic diagrams for illustrating operation of a light modulation element of FIG. 1B.
Figure 7B:
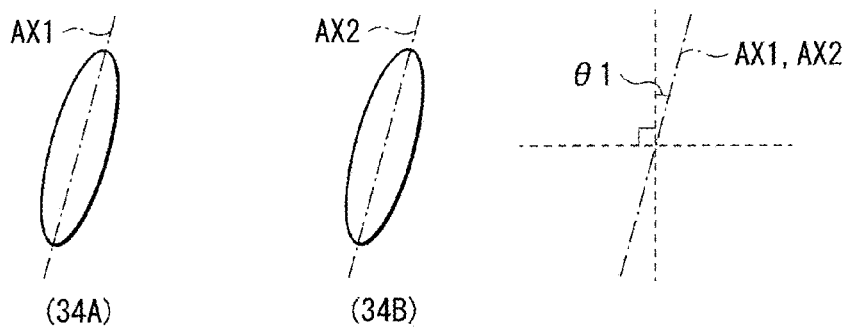
Figure 7C:
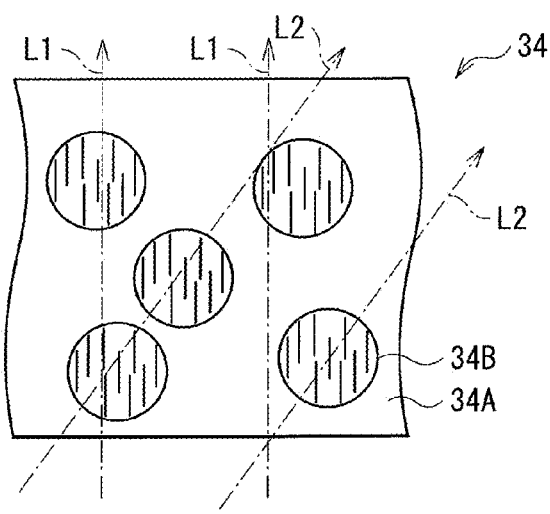

FIG. 7A schematically shows an example of an alignment state in the fine particles 34B when voltage is not applied between the lower and upper electrodes 32 and 36. In FIG. 7A, an alignment state in the bulk 34A is omitted to be shown. FIG. 7B shows an example of an optical indicatrix showing refractive-index anisotropy of each of the bulk 34A and the fine particle 34B when voltage is not applied between the lower and upper electrodes 32 and 36. The optical indicatrix shows refractive indices of linearly polarized light entering from various directions by a tensor ellipsoid, where a refractive index may be geometrically known through observation of a section of an ellipsoid from a light incidence direction. FIG. 7C schematically shows an example of an aspect where light L1 going in a front direction and light L2 going in an oblique direction are transmitted through the light modulation layer 34 when voltage is not applied between the lower and upper electrodes 32 and 36.

Figure 8A:
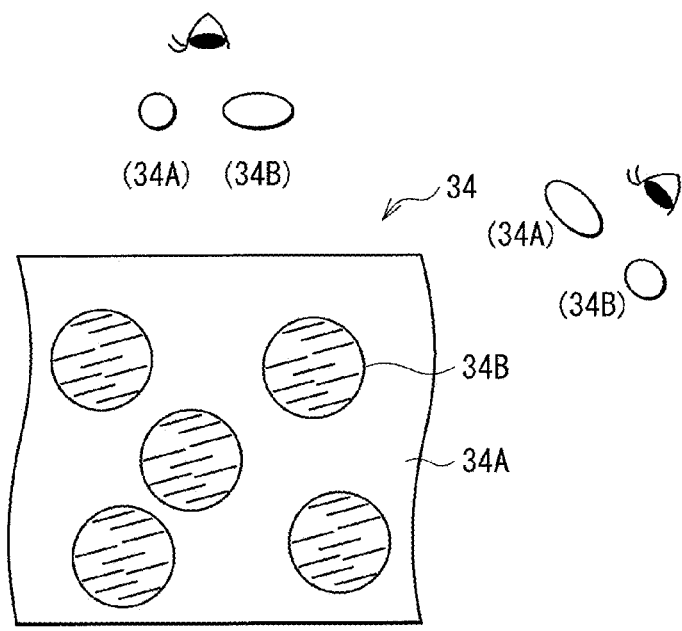
FIGS. 8A to 8C are schematic diagrams for illustrating the operation of the light modulation element of FIG. 1B.
Figure 8B:
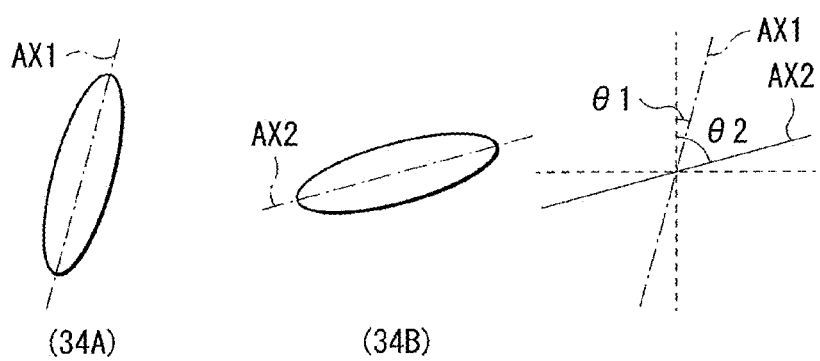
Figure 8C:
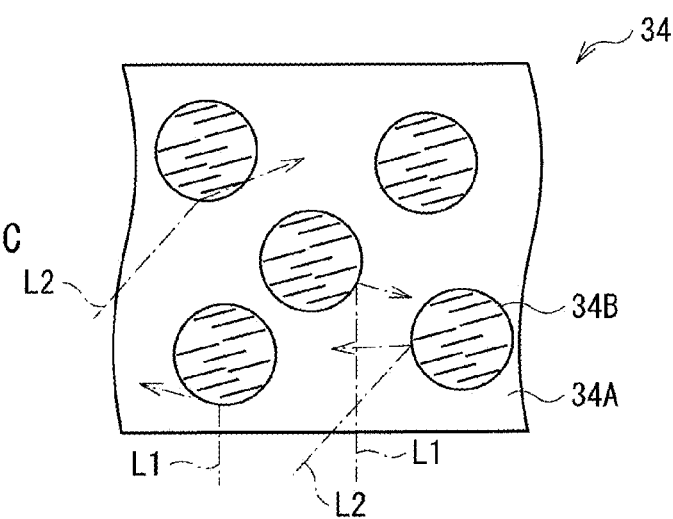

FIG. 8A schematically shows an example of an alignment state in the fine particles 34B when voltage is applied between the lower and upper electrodes 32 and 36. In FIG. 8A, an alignment state in the bulk 34A is omitted to be shown. FIG. 8B shows an example of an optical indicatrix showing refractive-index anisotropy of each of the bulk 34A and the fine particle 34B when voltage is applied between the lower and upper electrodes 32 and 36. FIG. 8C schematically shows an example of an aspect where light L1 going in a front direction and light L2 going in an oblique direction are scattered by the light modulation layer 34 when voltage is applied between the lower and upper electrodes 32 and 36.

The bulk 34A and the fine particle 34B are designed such that when voltage is not applied between the lower and upper electrodes 32 and 36, a direction of a light axis AX1 of the bulk 34A is equal (parallel) to a direction of a light axis AX2 of the fine particle 34B, for example, as shown in FIGS. 7A and 7B. The light axis AX1 or AX2 refers to a line parallel to a forward direction of a beam in which a refractive index has one value regardless of a polarization direction. A direction of the light axis AX1 and a direction of the light axis AX2 need not accurately correspond to each other, and may be somewhat different from each other due to, for example, manufacturing errors.

For example, the fine particle 34B is designed such that when voltage is not applied between the lower and upper electrodes 32 and 36, the light axis AX2 is parallel to the light incidence surface 10A of the light guide plate 10. Furthermore, the fine particle 34B is designed such that when voltage is not applied between the lower and upper electrodes 32 and 36, the light axis AX2 intersects with a normal of the transparent substrate 31 or 37 at a slight angle θ1 (see FIG. 7B). The angle θ1 is described in detail in description of a material forming the fine particle 34B.

For example, the bulk 34A is designed such that the light axis AX1 is constant regardless of presence of voltage applied between the lower and upper electrodes 32 and 36. Specifically, the bulk 34A is designed such that the light axis AX1 is parallel to the light incidence surface 10A of the light guide plate 10, and intersects with the normal of the transparent substrate 31 or 37 at a predetermined angle θ1, for example, as shown in FIGS. 7A and 7B and FIGS. 8A and 8B. In other words, the light axis AX1 of the bulk 34A is parallel to the light axis AX2 of the fine particle 34B in the case that voltage is not applied between the lower and upper electrodes 32 and 36.

The light axis AX2 need not accurately intersects with the normal of the transparent substrate 31 or 37 at the angle θ1 while being parallel to the light incidence surface 10A of the light guide plate 10, and may intersect with the normal at an angle slightly different from the angle θ1 due to, for example, manufacturing errors. In addition, the light axis AX1 or AX2 need not be accurately parallel to the light incidence surface 10A of the light guide plate 10, and may intersect with the light incidence surface 10A at a slight angle due to, for example, manufacturing errors.

Figure 9:
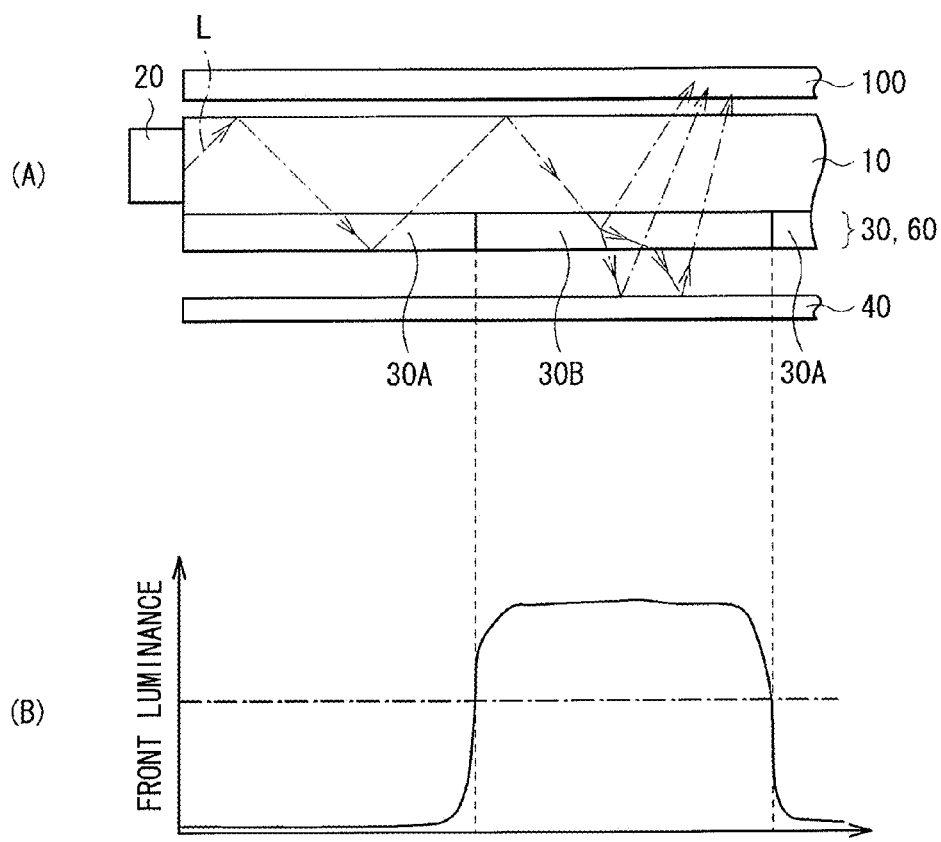
FIGS. 9A and 9B are schematic diagrams for illustrating operation of the backlight of FIG. 1A.

Preferably, an ordinary refractive index of the bulk 34A is equal to an ordinary refractive index of the fine particle 34B, and an extraordinary refractive index of the bulk 34A is also equal to an extraordinary refractive index of the fine particle 34B. In such a case, for example, when voltage is not applied between the lower and upper electrodes 32 and 36, refractive-index difference is substantially zero in all directions including front and oblique directions as shown in FIG. 7A, leading to a high light-transmitting property. Consequently, the light L1 going in a front direction and the light L2 going in an oblique direction are not scattered within the light modulation layer 34 and thus transmitted through the layer 34, for example, as shown in FIG. 7C. As a result, for example, as shown in FIGS. 9A and 9B, light L from the light source 20 (light in an oblique direction) is completely reflected at a boundary of the light-transmitting region 30A (an interface between the transparent substrate 31 or the light guide plate 10 and air), and therefore luminance at the light-transmitting region 30A (luminance of black display) is decreased compared with a case where the light modulation element 30 is not provided (a dashed line in FIG. 9B).

For example, the bulk 34A and the fine particle 34B are designed such that when voltage is applied between the lower and upper electrodes 32 and 36, a direction of the light axis AX1 is different from (intersects with) a direction of the light axis AX2 as shown in FIG. 8A. For example, the fine particle 34B is designed such that when voltage is applied between the lower and upper electrodes 32 and 36, the light axis AX2 of the fine particle 34B is parallel to the light incidence surface 10A of the light guide plate 10, and intersects with the normal of the transparent substrate 31 or 37 at an angle θ2 (for example, 90°) larger than the angle θ1.

The angle θ2 is described in detail in description of the material forming the fine particle 34B.

Thus, when voltage is applied between the lower and upper electrodes 32 and 36, refractive-index difference is large in all directions including front and oblique directions in the light modulation layer 34, leading to a high light-scattering property. Consequently, the light L1 going in a front direction and the light L2 going in an oblique direction are scattered within the light modulation layer 34, for example, as shown in FIG. 8C. As a result, light L (light in an oblique direction) from the light source 20 passes through a boundary of the light-scattering region 30B (interface between the transparent substrate 31 or the light guide plate 10 and air), and light transmitted to a reflective plate 40 side is reflected by the reflective plate 40 and then transmitted through the light modulation element 30, for example, as shown in FIGS. 9A and 9B. Therefore, luminance at the light-scattering region 30B is extremely high compared with a case where the light modulation element 30 is not provided (the dashed line in FIG. 9B), and besides luminance of partial white display (luminance enhancement) is increased in correspondence to decrease in luminance at the light-transmitting region 30A.

The ordinary refractive index of the bulk 34A may be somewhat different from the ordinary refractive index of the fine particle 34B due to, for example, manufacturing errors. For example, such difference is preferably 0.1 or less, and more preferably 0.05 or less. Similarly, the extraordinary refractive index of the bulk 34A may be somewhat different from the extraordinary refractive index of the fine particle 34B due to, for example, manufacturing errors. For example, such difference is preferably 0.1 or less, and more preferably 0.05 or less.

Refractive-index difference of the bulk 34A ($\Delta n_0$=extraordinary refractive index $n_1$-ordinary refractive index $n_0$) or refractive-index difference of the fine particle 34B ($\Delta n_1$=extraordinary refractive index $n_3$-ordinary refractive index $n_2$) is preferably as large as possible, which is preferably 0.05 or more, more preferably 0.1 or more, and still more preferably 0.15 or more. When refractive-index difference of each of the bulk 34A and the fine particle 34B is large, light-scattering ability of the light modulation layer 34 is improved, so that a light guide condition may be easily broken, leading to easy extraction of light from the light guide plate 10.

The bulk 34A and the fine particle 34B are different in response speed to an electric field. The bulk 34A has, for example, a streaky structure or porous structure being not responsive to an electric field, or a rod-like structure having a slower response speed than that of the fine particle 34B. The bulk 34A is formed of, for example, a polymer material obtained by polymerizing a low-molecular monomer. The bulk 34A is, for example, formed by polymerizing an alignable and polymerizable material (for example, monomer) by one or both of heat and light, the material being aligned along an alignment direction of the fine particle 34B or of the alignment film 33 or 35. For example, the streaky structure, the porous structure or the rod-like structure of the bulk 34A has a major axis in a direction that is parallel to the light incidence surface 10A of the light guide plate 10 and intersects with a surface of the transparent substrate 31 or 37 at a slight angle θ1.

The fine particle 34B mainly includes, for example, a liquid crystal material, and thus has a response speed sufficiently faster than that of the bulk 34A. The liquid crystal material (liquid crystal molecules) contained in the fine particle 34B includes, for example, rod-like molecules. For example, liquid crystal molecules having negative dielectric anisotropy (so-called negative liquid crystal) are used as the liquid crystal molecules contained in the fine particle 34B.

When voltage is not applied between the lower and upper electrodes 32 and 36, a major axis direction of each liquid crystal molecule is parallel to the light axis AX1 in the bulk 34A. Here, the major axis of the liquid crystal molecule in the fine particle 34B is parallel to the light incidence surface 10A of the light guide plate 10 and intersects with the normal of the transparent substrate 31 or 37 at a slight angle θ1. In other words, when voltage is not applied between the lower and upper electrodes 32 and 36, the liquid crystal molecule in the fine particle 34B is aligned with a tilt of the angle θ1 in a plane parallel to the light incidence surface 10A of the light guide plate 10. The angle θ1 is called pre-tilt angle, and, for example, preferably within a range of 0.1° to 30°. The angle θ1 is more preferably within a range of 0.5° to 10°, and still more preferably within a range of 0.7° to 2°. When the angle θ1 is increased, light-scattering efficiency tends to be reduced due to a reason described later. On the other hand, a too small angle θ1 causes variation of the azimuth at which a liquid crystal falls down upon voltage application. For example, a liquid crystal may fall down in a 180-degree opposite direction (reverse tilt). Consequently, refractive-index difference of each of the fine particle 34B and the bulk 34A may not be effectively used, and therefore light-scattering efficiency is reduced and thus luminance tends to be reduced.

When voltage is applied between the lower and upper electrodes 32 and 36, the major axis direction of the liquid crystal molecule intersects with (or is perpendicular to) the light axis AX1 in the bulk 34A. Here, the major axis of the liquid crystal molecule in the fine particle 34B is parallel to the light incidence surface 10A of the light guide plate 10 and intersects with the normal of the transparent substrate 31 or 37 at an angle θ2 (for example, 90°) larger than the angle θ1. In other words, when voltage is applied between the lower and upper electrodes 32 and 36, the liquid crystal molecule in the fine particle 34B is aligned with a tilt of the angle θ2 or aligned lying at the angle θ2 (=90°) in the plane parallel to the light incidence surface 10A of the light guide plate 10.

Any monomer can be used as the alignable and polymerizable monomer as long as the monomer is optically anisotropic and mixable with the liquid crystal. In particular, a UV-curable low-molecular monomer is preferable in the embodiment. When voltage is not applied, a direction of optical anisotropy of the liquid crystal preferably corresponds to that of a polymerization product (polymer material) of the low-molecular monomer. Therefore, the liquid crystal and the low-molecular monomer are preferably aligned in the same direction before UV curing. In the case of using a liquid crystal for the fine particle 34B, when the liquid crystal includes rod-like molecules, a rod-like monomer material is preferably used. According to the above, a polymerizable and liquid-crystalline material is preferably used for the monomer material, and, for example, the material preferably has a polymerizable functional group being one or more functional group selected from functional groups consisting of an acrylate group, a methacrylate group, an acryloyloxy group, a methacryloyloxy group, a vinyl ether group, and an epoxy group. The functional groups may be polymerized by irradiating ultraviolet rays, infrared rays or an electron beam or by heating. A liquid crystalline material having a multifunctional group may be added to suppress alignment reduction during UV irradiation. When the bulk 34A includes the streaky structure, a bifunctional liquid-crystalline monomer is preferably used as a material of the bulk 34A. A monofunctional monomer may be added to a material of the bulk 34A in order to adjust liquid-crystallinity exhibiting temperature, or tri- or multi-functional monomer may be added in order to increase crosslink density.

The driver circuit 50 controls magnitude of voltage applied to a pair of electrodes (lower electrode 32 and upper electrode 36) of each light modulation cell 30-1 such that, for example, the light axis AX2 of the fine particle 34B is parallel or approximately parallel to the light axis AX1 of the bulk 34A in a light modulation cell 30-1, and the light axis AX2 of the fine particle 34B intersects with or is perpendicular to the light axis AX1 of the bulk 34A in another light modulation cell 30-1. In other words, the driver circuit 50 may control directions of the light axis AX1 of the bulk 34A and the light axis AX2 of the fine particle 34B to be equal (or approximately equal) to each other or different from (or perpendicular to) each other.

Hereinafter, a method of manufacturing the backlight 1 of the embodiment is described with reference to FIGS. 10A to 12C.

Figure 10A:
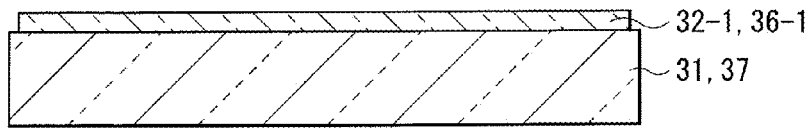
FIGS. 10A to 10C are section diagrams for illustrating a manufacturing process of the backlight of FIG. 1A.
Figure 10B:
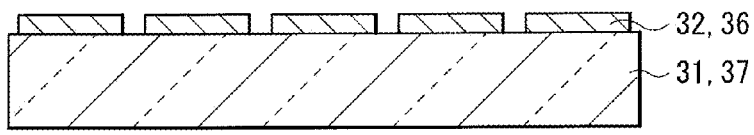

First, transparent conductive films 32-1 and 36-1 are formed on the transparent substrates 31 and 37 made of glass or plastic-film substrates, respectively (FIG. 10A). Next, a resist layer (not shown) is formed on the whole surface of each conductive film, and then the resist layer is patterned to form an electrode pattern. Next, the transparent conductive films 32-1 and 36-1 are selectively removed with the resist layers as masks, so that the lower electrode 32 and the upper electrode 36 are formed (FIG. 10B). Then, the resist layers are removed.

As a patterning method, for example, a photolithography method, a laser processing method, a pattern printing method or a screen printing method may be used. Alternatively, for example, Merck's material "HYPER ETCH" may be used for patterning through a sequential process of screen printing, predetermined heating, and rinsing. An electrode pattern is determined by a drive method and a division number of partial drive. For example, when a 42-inch display is divided into 12×6, an electrode span is about 80 mm, and width of a slit portion between electrodes is about 10 to 500 μm. ITO, IZO, ZnO or the like may be used for an electrode material. The material may be used for both of the lower and upper electrodes 32 and 36, or may be used for one of the electrodes while a metal material having high reflectance is used for the other electrode. Alternatively, the electrode pattern may be formed by pattern-printing of ITO nano-particles and baking of the nano-particles.

Figure 10C:
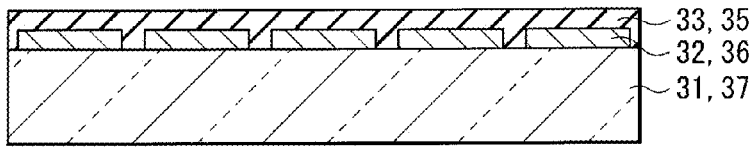

Next, each of the alignment films 33 and 35 is applied on the whole surface, and then the coated film is dried and baked (FIG. 10C). When a polyimide-series material is used for the alignment films 33 and 35, NMP (N-methyl-2-pylorydon) is often used as a solvent. In such a case, about 200° C. is necessary for baking in atmosphere. In this case, when a plastic substrate is used for the transparent substrates 31 and 37, the alignment films 33 and 35 may be vacuum-dried and baked at 100° C. Then, rubbing treatment is performed to the alignment films 33 and 35. Consequently, the alignment films 33 and 35 act as alignment films for horizontal alignment, and furthermore, pre-tilt may be added in a rubbing direction of each of the alignment films 33 and 35.

Figure 11A:
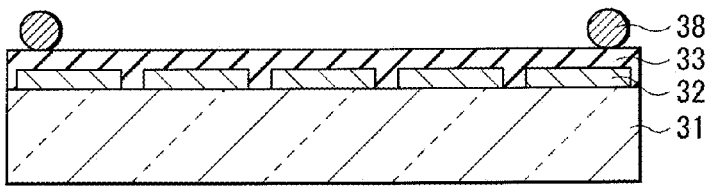
FIGS. 11A to 11C are section diagrams for illustrating the manufacturing process following FIG. 10C.

Next, spacers 38 are sprayed on the alignment film 33 by a dry or wet process in order to form a cell gap (FIG. 11A). When the light modulation cell 30-1 is formed by a vacuum bonding method, the spacers 38 may be mixed in a mixture to be dropped. Columnar spacers may be formed by a photolithography method in place of the spacers 38.

Figure 11B:
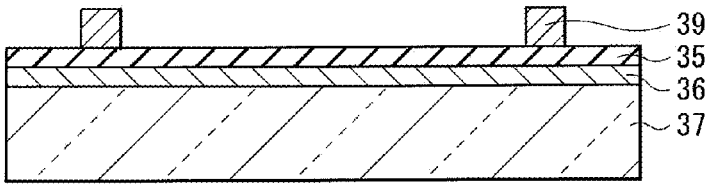

Next, a sealing agent pattern 39 for bonding is formed by applying on the alignment film 35, for example, in a frame pattern so as to prevent leakage of a liquid crystal (FIG. 11B). The sealing agent pattern 39 may be formed by a dispenser method or a screen printing method.

While a vacuum bonding method (One Drop Fill method, or ODF method) is described below, the light modulation cell 30-1 may be formed by a vacuum injection method or the like.

Figure 11C:
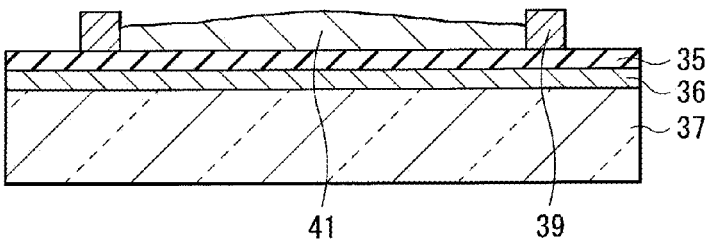

First, a mixture 41 of a liquid crystal and a monomer in a volume determined by a cell gap and cell area is uniformly dropped in a plane (FIG. 11C). The mixture 41 is preferably dropped by a linear-guide-type precision dispenser. However, a die coater may be used with a sealing agent pattern 39 as a bank.

The above materials may be used for the liquid crystal and the monomer, and a weight ratio of the liquid crystal to the monomer is 98/2 to 50/50, preferably 95/5 to 75/25, and more preferably 92/8 to 85/15. While drive voltage may be decreased by increasing a percentage of the liquid crystal, if the liquid crystal is too increased, whiteness may be decreased during voltage application, or response speed may be reduced and thus a transparent state tends to hardly return when voltage is turned off.

A polymerization initiator is added to the mixture 41 in addition to the liquid crystal and the monomer. A ratio of the polymerization initiator to be added to the monomer is adjusted within a range of 0.1 to 10 wt % depending on a UV wavelength to be used. The mixture 41 may be further added with a polymerization inhibitor, a plasticizer, a viscosity adjuster or the like as necessary. When the monomer is in a solid or gel state at room temperature, a cap, a syringe, and a substrate are preferably warmed.

The transparent substrates 31 and 37 are set in a vacuum bonder (not shown), and then the vacuum bonder is evacuated for bonding (FIG. 12A). Then, the bonded cell is exposed to the atmosphere, and a cell gap is equalized by uniform pressurization at atmospheric pressure. The cell gap, which may be appropriately selected based on a relationship between white luminance (whiteness) and drive voltage, is 5 to 40 µm, preferably 6 to 20 µm, and more preferably 7 to 10 µm.

After bonding, alignment treatment is preferably performed as necessary (not shown). When the bonded cell is inserted between crossed nicol polarizers, if light leakage occurs, the cell is heated for a certain time or left to stand at room temperature for alignment. Then, ultraviolet rays L3 are irradiated to polymerize the monomer into a polymer (FIG. 12B). In this way, the light modulation element 30 is manufactured.

When ultraviolet rays are irradiated, cell temperature is preferably controlled to be not changed. Use of an infrared cut filter or use of UV-LED as a light source is preferable. Ultraviolet irradiance is preferably appropriately adjusted depending on the liquid crystal material or monomer material to be used or compositions of the materials in consideration of a fact that the irradiation affects a structure of a composite material, and the irradiance is preferably within a range of 0.1 to 500 mW/cm$^2$, and more preferably 0.5 to 30 mW/cm$^2$. As ultraviolet irradiance is lower, drive voltage tends to be lower, and therefore ultraviolet irradiance may be preferably selected in the light of both productivity and properties.

Then, the light modulation element 3 is attached to the light guide plate 10. The element 30 may be attached by either of adhesion and bonding, and is preferably adhered or bonded with a material having a refractive index similar to a refractive index of the light guide plate 10 and to a refractive index of a substrate material of the light modulation element 30 to the utmost. Finally, lead lines (not shown) are attached to the lower electrode 32 and the upper electrode 36. In this way, the backlight 1 of the embodiment is manufactured.

While description has been made on a process where the light modulation element 30 is formed and then attached to the light guide plate 10, a transparent substrate 37, having the alignment film 35 formed thereon, may be beforehand attached to a surface of the light guide plate 10 before the backlight 1 is formed. Moreover, the backlight 1 may be formed by either of a sheet-feed method and a roll-to-roll method.

Next, operation and effects of the backlight 1 of the embodiment are described.

In the backlight 1 of the embodiment, for example, voltage is applied to a pair of electrodes (lower electrode 32 and upper electrode 36) of each light modulation cell 30-1 such that the light axis AX2 of the fine particle 34B is parallel or approximately parallel to the light axis AX1 of the bulk 34A in a light modulation cell 30-1, and the light axis AX2 of the fine particle 34B intersects with or is perpendicular to the light axis AX1 of the bulk 34A in another light modulation cell 30-1. Consequently, light, which is emitted from the light source 20 and enters the light guide plate 10, is transmitted through the light-transmitting region 30A, where the light axis AX1 is parallel or approximately parallel to the light axis AX2, of the light modulation element 30. On the other hand, light, which is emitted from the light source 20 and enters the light guide plate 10, is scattered by the light-scattering region 30B, where the light axis AX1 intersects with or is perpendicular to the light axis AX2, of the light modulation element 30. Among the scattered light, light passing through a bottom of the light-scattering region 30B is reflected by the reflective plate 40, and returned to the light guide plate 10, and then emitted from a top of the backlight 1. Among the scattered light, light going to a top of the light-scattering region 30B is transmitted through the light guide plate 10, and then emitted from the top of the backlight 1. In this way, in the embodiment, light is largely emitted from the top of the light-scattering region 30B while being substantially not emitted from a top of the light-transmitting region 30A. This increases a modulation ratio in a front direction.

PDLC is typically formed through a process where a liquid crystal material and an isotropic low-molecular material are mixed, and such a mixture is subjected to ultraviolet irradiation or solvent drying to induce phase separation, and is typically in a form of a composite layer including fine particles of the liquid crystal material dispersed in a polymer material. The liquid crystal material in the composite layer is randomly directed and therefore exhibits a light-scattering property during no voltage application. In contrast, the liquid crystal material is aligned in an electric field direction during voltage application, and therefore when an ordinary refractive index of the liquid crystal material is equal to a refractive index of the polymer material, the liquid crystal material exhibits a high light-transmitting property in a front direction (normal direction of PDLC). However, in the PDLC, an extraordinary refractive index of the liquid crystal material is significantly different from the refractive index of the polymer material in an oblique direction, and therefore the PDLC exhibits a light-scattering property in the oblique direction despite the high light-transmitting property in the front direction.

Typically, a light modulation element using PDLC has often has a structure where PDLC is interposed between two glass plates having transparent conductive films formed thereon. When light is obliquely incident from the air to the light modulation element having the above structure, the obliquely incident light is refracted due to difference in refractive index between the air and the glass plate, and thus incident to the PDLC at a smaller angle. Therefore, significant scattering does not occur in such a light modulation element. For example, when light is incident at 80° from the air, an incident angle of the light to the PDLC is decreased to about 40° due to refraction at a glass boundary.

However, in an edge light type PDLC using a light guide plate, since light is incident through the light guide plate, the light traverses the PDLC at a large angle of about 80°. Therefore, an extraordinary refractive index of a liquid crystal material is greatly different from a refractive index of a polymer material, and furthermore, light traverses the PDLC at the large angle, leading to increase in length of a light path for scattering. For example, when fine particles of a liquid crystal material having an ordinary refractive index of 1.5 and an extraordinary refractive index of 1.65 are dispersed in a polymer material having a refractive index of 1.5, refractive-index difference is zero in a front direction (normal direction of PDLC), but large in an oblique direction. Therefore, light-scattering may not be reduced in an oblique direction, leading to a bad view angle characteristic. Furthermore, when an optical film such as a diffuser film is provided on the light guide plate, since oblique leakage light is diffused even in a front direction by the diffuser film or the like, light leakage in a front direction increases, leading to a low modulation ratio in the front direction.

In the embodiment, since the bulk 34A and the fine particle 34B mainly include optically anisotropic materials each, light-scattering is reduced and thus a light-transmitting property may be improved in an oblique direction. For example, when the bulk 34A and the fine particle 34B mainly include optically anisotropic materials being equal in ordinary refractive index and in extraordinary refractive index, directions of respective light axes of the bulk and the fine particle are equal or approximately equal in a region where voltage is not applied between the lower and upper electrodes 32 and 36. Consequently, refractive-index difference is reduced or eliminated in all directions including a front direction (normal direction of the light modulation element 30) and an oblique direction, leading to a high light-transmitting property. As a result, light leakage may be reduced or substantially eliminated over a wide view angle range, leading to improvement in view angle characteristic.

For example, when a liquid crystal having an ordinary refractive index of 1.5 and an extraordinary refractive index of 1.65 and a liquid-crystalline monomer having an ordinary refractive index of 1.5 and an extraordinary refractive index of 1.65 are mixed, and the liquid-crystalline monomer is polymerized while the liquid crystal and the liquid-crystalline monomer are aligned by an alignment film or by an electric field, a light axis of the liquid crystal corresponds to a light axis of a polymer formed through polymerization of the liquid-crystalline monomer. Consequently, refractive index matching may be achieved in any direction. In such a case, a high light-transmitting state may be achieved, leading to further improvement in view angle characteristic.

In the embodiment, for example, as shown in FIGS. 9A and 9B, luminance at the light-transmitting region 30A (luminance of black display) is decreased compared with a case where the light modulation element 30 is not provided (a dashed line in FIG. 9B). On the other hand, luminance at the light-scattering region 30B is extremely high compared with a case where the light modulation element 30 is not provided (the dashed line in FIG. 9B), and besides luminance of partial white display (luminance enhancement) is increased in correspondence to decrease in luminance at the light-transmitting region 30A.

The luminance enhancement means a technique to increase luminance in partial white display compared with full-screen white display. The technique is generally used in CRT or PDP. However, in a liquid crystal display, since a backlight uniformly emits light over the whole area regardless of an image, luminance may not be partially increased. When an LED backlight including a plurality of LEDs arranged two-dimensionally is used as the backlight, the LEDs may be partially unlit. However, in such a case, light is not diffused from a dark region of the unlit LEDs, leading to decrease in luminance compared with a case of lighting all LEDs. Luminance may be increased by increasing current to partially lit LEDs. However, in such a case, large current flows within an extremely short time, causing a difficulty in a circuit load or reliability.

In the embodiment, since the bulk 34A and the fine particle 34B mainly include optically anisotropic materials each, light-scattering is suppressed in an oblique direction, and therefore light leakage from the light guide plate 10 is reduced in a dark state. Consequently, since light is guided from a partially dark portion to a partially light portion, luminance enhancement may be achieved without increasing input power to the backlight 1.

In the embodiment, the light axis AX2 of the fine particle 34B is parallel to the light incidence surface 10A of the light guide plate 10, and intersects with the normal of the transparent substrate 31 or 37 at a slight angle θ1 in a region where voltage is not applied between the lower and upper electrodes 32 and 36. In other words, liquid crystal molecules in the fine particle 34B are aligned with a tilt of the angle θ1 (with a pre-tilt angle) in a plane parallel to the light incidence surface 10A. Therefore, when voltage is applied between the lower and upper electrodes 32 and 36, the liquid crystal material in the fine particle 34B falls down in the plane parallel to the light incidence surface 10A instead of rising up in a random direction. Here, the light axes AX1 and AX2 of the bulk 34A and the fine particle 34B intersect with each other or are perpendicular to each other in the plane parallel to the light incidence surface 10A. Among light entering through the light incidence surface 10A of the light guide plate 10, light oscillating perpendicularly to the transparent substrate 31 is affected by difference between an ordinary refractive index of the fine particle 34B and an extraordinary refractive index of the bulk 34A. The difference between the ordinary refractive index of the fine particle 34B and the extraordinary refractive index of the bulk 34A is large, which increases scattering efficiency of light oscillating perpendicularly to the transparent substrate 31. In contrast, light oscillating parallel to the transparent substrate 31 is affected by difference between an extraordinary refractive index of the fine particle 34B and an ordinary refractive index of the bulk 34A. The difference between the extraordinary refractive index of the fine particle 34B and the ordinary refractive index of the bulk 34A is also large, which increases scattering efficiency of light oscillating parallel to the transparent substrate 31. Light propagating through a region, where voltage is applied between the lower and upper electrodes 32 and 36, contains many oblique components. For example, when an acrylic light guide plate is used as the light guide plate 10, light propagates at an angle of 41.8° or more in the region where voltage is applied between the lower and upper electrodes 32 and 36. As a result, refractive-index difference is large in all directions including an oblique direction, and therefore a high light-scattering property is obtained, leading to improvement in display luminance. In addition, display luminance may be more improved due to effects of the luminance enhancement.

For example, when the light axes AX1 and AX2 of the bulk 34A and the fine particle 34B are set perpendicularly to the light incidence surface 10A of the light guide plate 10 during no voltage application, and the liquid crystal material in the fine particle 34B rises up in a plane perpendicular to the light incidence surface 10A upon voltage application between the lower and upper electrodes 32 and 36, light oscillating perpendicularly to the transparent substrate 31 is affected by difference between the ordinary refractive index of the fine particle 34B and the extraordinary refractive index of the bulk 34A, although light oscillating parallel to the transparent substrate 31 is affected by difference between the ordinary refractive index of the fine particle 34B and the ordinary refractive index of the bulk 34A. Here, the difference between the ordinary refractive index of the fine particle 34B and the ordinary refractive index of the bulk 34A is almost zero or completely zero. Therefore, among light entering through the light incidence surface 10A, light oscillating perpendicularly to the transparent substrate 31 is affected by large refractive-index difference as in the above case, although light oscillating parallel to the transparent substrate 31 is hardly or not affected by refractive-index difference. As a result, while scattering efficiency of light oscillating perpendicularly to the transparent substrate 31 is high, scattering efficiency of light oscillating parallel to the transparent substrate 31 is low or zero. Therefore, when the light axes AX1 and AX2 are set perpendicularly to the light incidence surface 10A, light-scattering efficiency is low compared with the case where the light axes AX1 and AX2 are set parallel to the light incidence surface 10A, and therefore luminance of light extracted from the light guide plate 10 is reduced compared with in the light modulation element 30 in the embodiment.

Therefore, in the embodiment, display luminance may be improved while light leakage may be reduced or substantially eliminated over a wide view angle range. As a result, a modulation ratio may be increased in a front direction.

In the embodiment, one or both of the lower and upper electrodes 32 and 36 provided within the light modulation element 30 includes a plurality of partial electrodes (32A or 36A) adjacent to one another. Furthermore, one partial electrodes of the plurality of partial electrodes (32A or 36A) have irregular shapes on edges adjacent to other partial electrodes of the plurality of partial electrodes (32A or 36A). Consequently, since clearness of a boundary between light-transmitting and light-scattering regions is reduced, when light is partially extracted from the light guide plate 10, even if difference in luminance is large in a boundary portion caused by an electrode pattern, clearness of a boundary between dark and light regions may be reduced. As a result, a brightness boundary portion of illumination light may be blurred. Moreover, in the embodiment, an electrode pattern in the light modulation element 30 is simply devised to blur a brightness boundary portion of illumination light, and thus a diffuser plate need not be added, reduction in thickness is not disturbed. Thus, in the embodiment, a brightness boundary portion of illumination light may be blurred without disturbing reduction in thickness.

Modification

First Modification

In the embodiment, when the irregular shape of one or both of the lower and upper electrodes 32 and 36 is a zigzag shape, a profile of a convex portion in a part of the irregular shape is linear, for example, as shown in FIG. 3A. However, the profile may have another shape.

Figure 13:
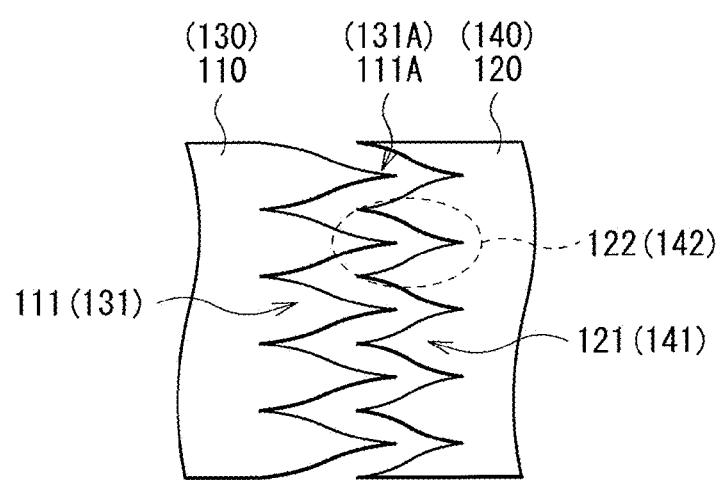
FIG. 13 is a plan diagram showing a modification of edges of the electrodes of FIG. 3A.

For example, when a partial electrode 110 has an irregular shape, the irregular shape of the partial electrode 110 may be a zigzag shape with a plurality of first convex portions 111, having acute ends, being arranged, where a profile of one or more of edges of the first convex portions 111 is a function of the power of m of the sine (m is an even number such as 2, 4 or 6) with an end as an origin, for example, as shown in FIG. 13. Here, the profile of one or more of edges of the first convex portions 111 corresponds to part of a curve drawn by the function of the power of m of the sine. The profile of the edge need not accurately trace the function of the power of m of the sine, and may roughly trace the function of the power of m of the sine. For example, when a partial electrode 120 has an irregular shape, the irregular shape of the partial electrode 120 may be a zigzag shape with a plurality of second convex portions 121, having acute ends, being arranged, where a profile of one or more of edges of the second convex portions 121 is a function of the power of m of the sine or roughly a function of the power of m of the sine with an end as an origin, for example, as shown in FIG. 13. Moreover, for example, when a partial electrode 130 has an irregular shape, the irregular shape of the partial electrode 130 may be a zigzag shape with a plurality of first convex portions 131, having acute ends, being arranged, where a profile of one or more of edges of the first convex portions 131 is a function of the power of m of the sine or roughly a function of the power of m of the sine with an end as an origin, for example, as shown in FIG. 13. Furthermore, for example, when a partial electrode 140 has an irregular shape, the irregular shape of the partial electrode 140 may be a zigzag shape with a plurality of second convex portions 141, having acute ends, being arranged, where a profile of one or more of edges of the second convex portions 141 is a function of the power of m of the sine or roughly a function of the power of m of the sine with an end as an origin, for example, as shown in FIG. 13. When both the partial electrode 110 and the partial electrode 120 have irregular shapes, the respective irregular shapes may be zigzag shapes as shown in FIG. 13. When both the partial electrode 130 and the partial electrode 140 have irregular shapes, the respective irregular shapes may be zigzag shapes as shown in FIG. 13. When all the partial electrodes 110 to 140 have irregular shapes, the respective irregular shapes may be zigzag shapes as shown in FIG. 13. In such cases, electrode area of the lower electrode 32 or the upper electrode 36 gradually changes near an end of each convex portion of the irregular shape. Consequently, since clearness of a boundary between light-transmitting and light-scattering regions is more reduced, when light is partially extracted from the light guide plate 10, clearness of a boundary between dark and light regions may be more reduced. As a result, a brightness boundary portion of illumination light may be more blurred.

Second Modification

Figure 14A:
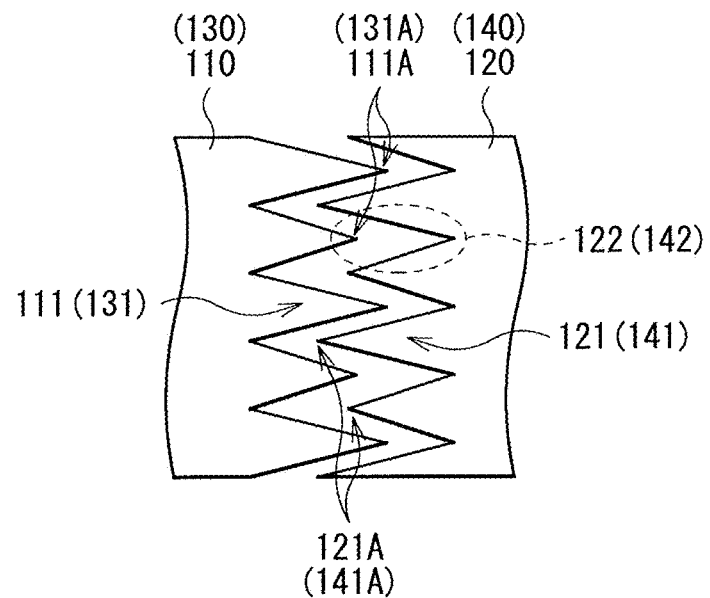
FIGS. 14A and 14B are plan diagrams showing another modification of edges of the electrodes of FIG. 3A.
Figure 14B:
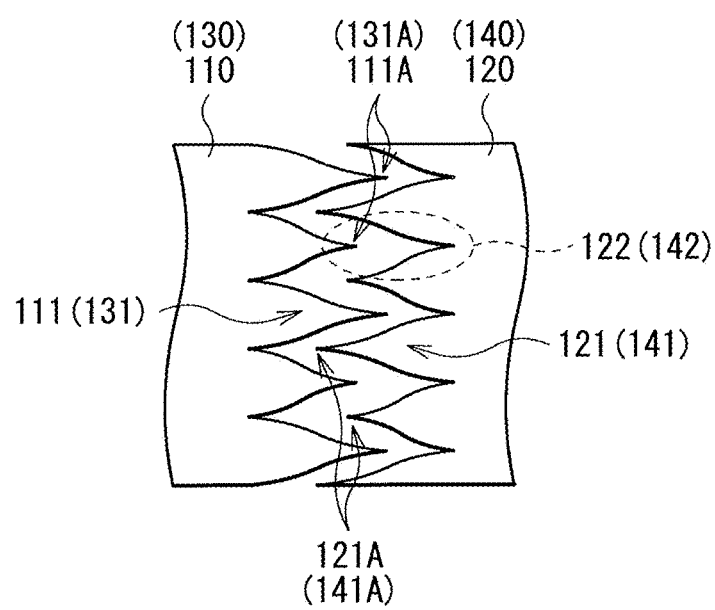

In the embodiment and the first modification, when a partial electrode 110 has an irregular shape, ends 111A of the first convex portions 111 may be arranged in an alternate manner, for example, as shown in FIGS. 14A and 14B. In FIGS. 14A and 14B, 110 (130) means 110 or 130, which is similar in other symbols. Similarly, for example, when a partial electrode 120 has an irregular shape, ends 121A of the second convex portions 121 may be arranged in an alternate manner, for example, as shown in FIGS. 14A and 14B. In addition, when a partial electrode 130 has an irregular shape, ends 131A of the first convex portions 131 may be arranged in an alternate manner, for example, as shown in FIGS. 14A and 14B. In addition, for example, when a partial electrode 140 has an irregular shape, ends 141A of the second convex portions 141 may be arranged in an alternate manner, for example, as shown in FIGS. 14A and 14B. When both the partial electrode 110 and the partial electrode 120 have irregular shapes, the respective ends of the irregular shapes may be arranged in an alternate manner, for example, as shown in FIGS. 14A and 14B. When both the partial electrode 130 and the partial electrode 140 have irregular shapes, the respective ends of the irregular shapes may be arranged in an alternate manner, for example, as shown in FIGS. 14A and 14B. When all the partial electrodes 110 to 140 have irregular shapes, the respective ends of the irregular shapes may be arranged in an alternate manner, for example, as shown in FIGS. 14A and 14B. Even in such cases, a brightness boundary portion of illumination light may be more blurred.

Third Modification

Figure 15:
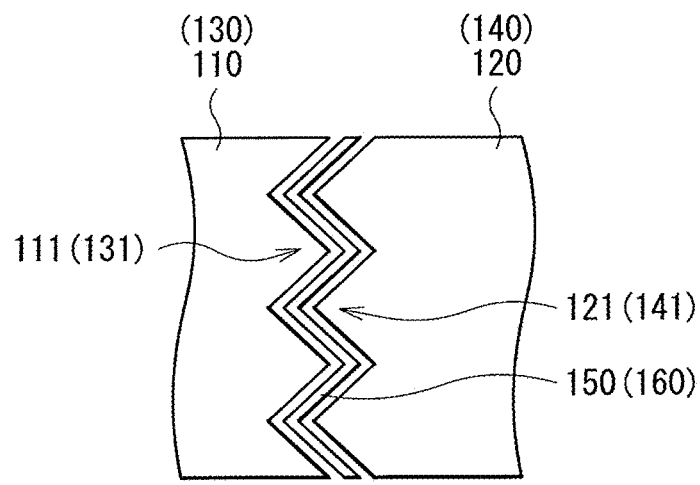
FIG. 15 is a plan diagram showing still another modification of edges of the electrodes of FIG. 3A.

In the embodiment and the first and second modifications, when irregular shapes are provided on respective adjacent edges of the partial electrodes 110 and 120, a partial electrode 150, extending in accordance with the respective irregular shapes on the edges of the partial electrodes 110 and 120, may be provided in a gap between the irregular shapes, for example, as shown in FIG. 15. In FIG. 15, 110 (130) means 110 or 130, which is similar in other symbols. Similarly, when irregular shapes are provided on respective adjacent edges of the partial electrodes 130 and 140, a partial electrode 160, extending in accordance with the respective irregular shapes on the edges of the partial electrodes 130 and 140, may be provided in a gap between the irregular shapes, for example, as shown in FIG. 15. When all the partial electrodes 110 to 140 have irregular shapes, the respective ends of the irregular shapes may be arranged in an alternate manner, as shown in FIGS. 14A and 14B. In such cases, it is preferable that a power supply (not shown) is provided to apply voltage to the partial electrodes 110 to 160, and the power supply applies voltage to the partial electrodes 110 to 160 such that the following expression is satisfied. In such a case, luminance change in a plane may be controlled to be more gradual, and consequently a brightness boundary portion of illumination light may be more blurred.

$$V1 > V2 > V3$$

V1: voltage applied to the partial electrodes 110 and 130 by the power supply.

V2: voltage applied to the partial electrodes 150 and 160 by the power supply.

V3: voltage applied to the partial electrodes 120 and 140 by the power supply.

Fourth Modification

In the embodiment and the modifications, a vertical alignment film is used for the alignment films 33 and 35 so that the respective light axes AX1 and AX2 intersect with the normal of the transparent substrate 31 or 37 at the slight angle θ1 during no voltage application. However, a horizontal alignment film may be used for the alignment films 33 and 35 so that the respective light axes AX1 and AX2 intersect with a surface of the transparent substrate 31 or 37 at a slight angle during no voltage application.

Figure 16:
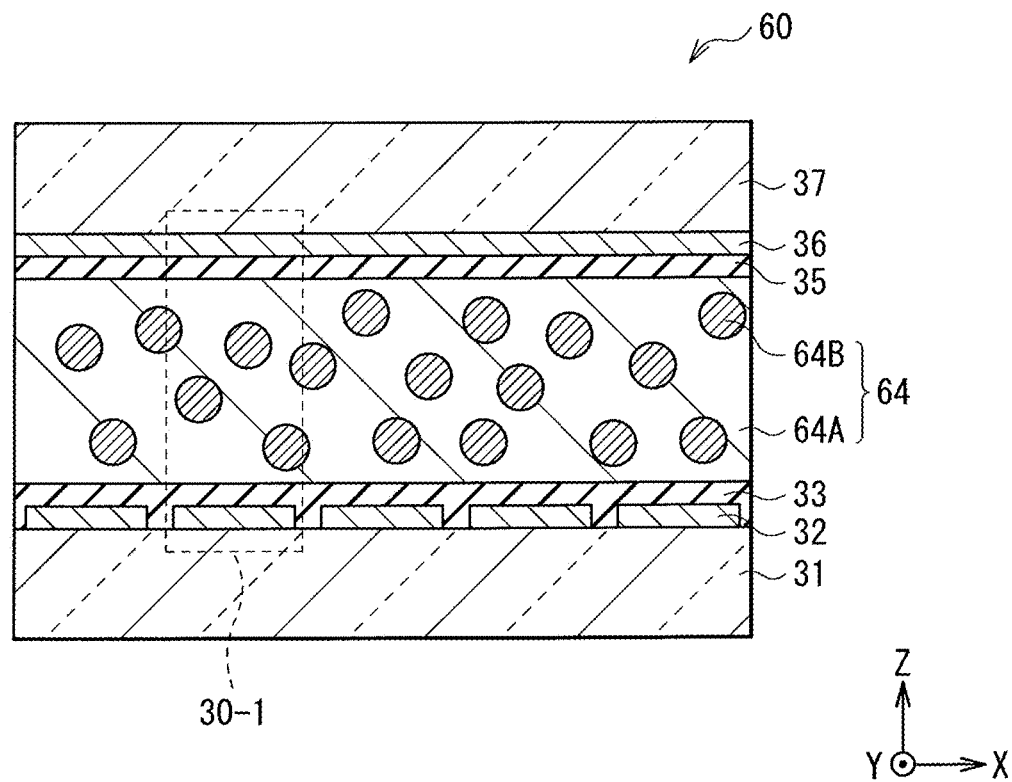
FIG. 16 is a section diagram showing another example of a configuration of the light modulation element of FIG. 1B.

In the modification, a light modulation layer 64 is provided in place of the light modulation layer 34 in the embodiment and the modifications, for example, as shown in FIG. 16. Hereinafter, description of common portions to the configurations of the embodiment and the modifications are appropriately omitted, and different points from the configurations are mainly described.

The light modulation layer 64 is a composite layer including a bulk 64A (second region) and a plurality of fine particles 64B (first region) dispersed in the bulk 64A, for example, as shown in FIG. 16. The bulk 64A and the fine particles 64B have optical anisotropy each.

Figure 17A:
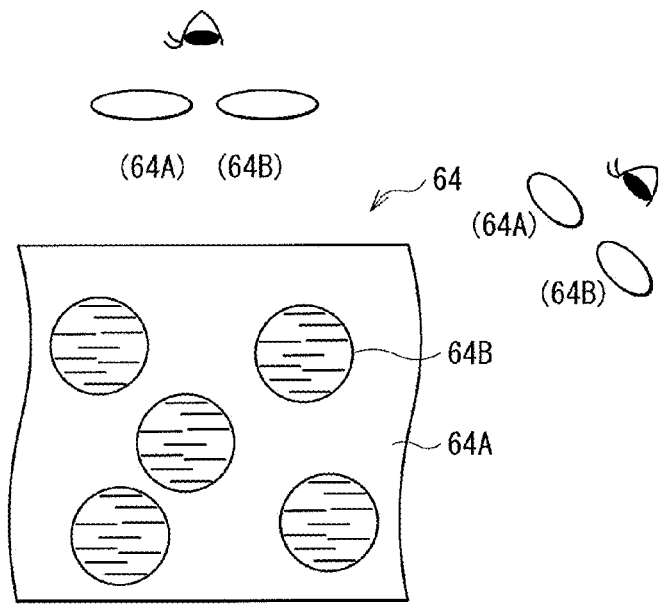
FIGS. 17A to 17C are schematic diagrams for illustrating operation of the light modulation element of FIG. 16.
Figure 17B:
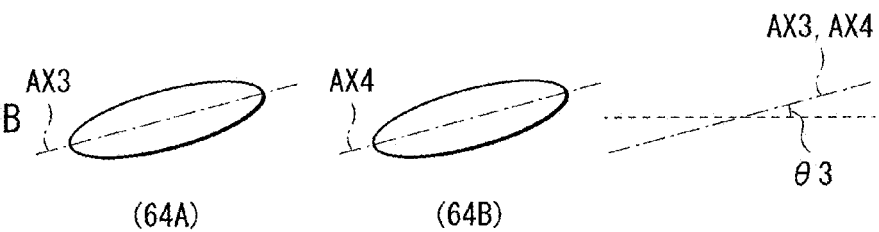
Figure 17C:
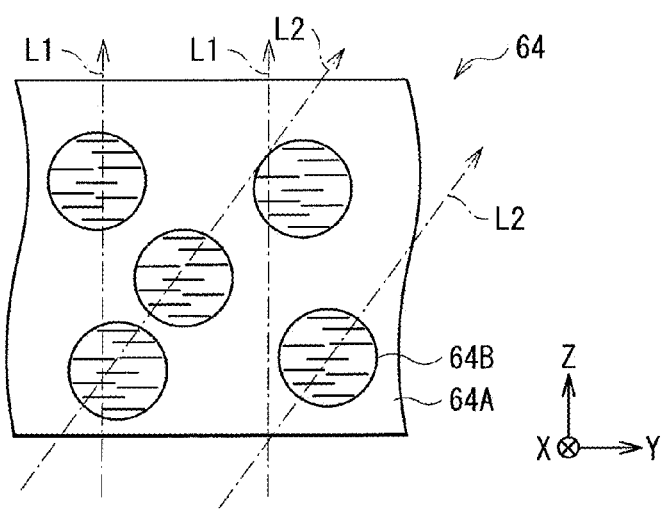

FIG. 17A schematically shows an example of an alignment state in the fine particles 64B when voltage is not applied between the lower and upper electrodes 32 and 36. In FIG. 17A, an alignment state in the bulk 64A is omitted to be shown. FIG. 17B shows an example of an optical indicatrix showing refractive-index anisotropy of each of the bulk 64A and the fine particle 64B when voltage is not applied between the lower and upper electrodes 32 and 36. FIG. 17C schematically shows an example of an aspect where light L1 going in a front direction and light L2 going in an oblique direction are transmitted through the light modulation layer 64 when voltage is not applied between the lower and upper electrodes 32 and 36.

Figure 18A:
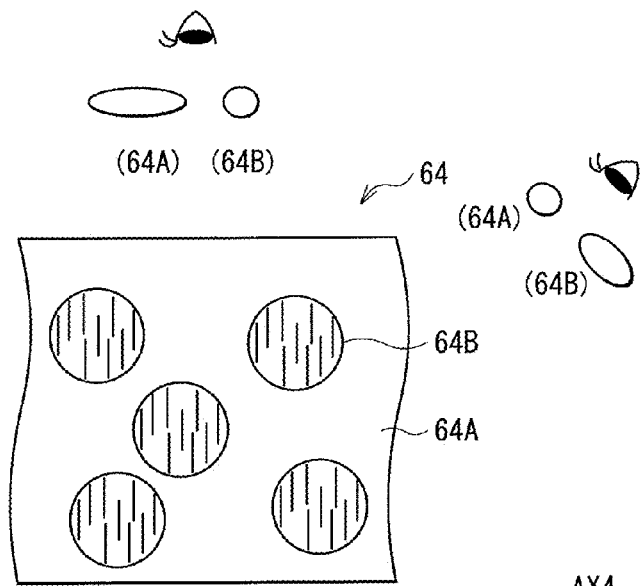
FIGS. 18A to 18C are schematic diagrams for illustrating the operation of the light modulation element of FIG. 16.
Figure 18B:
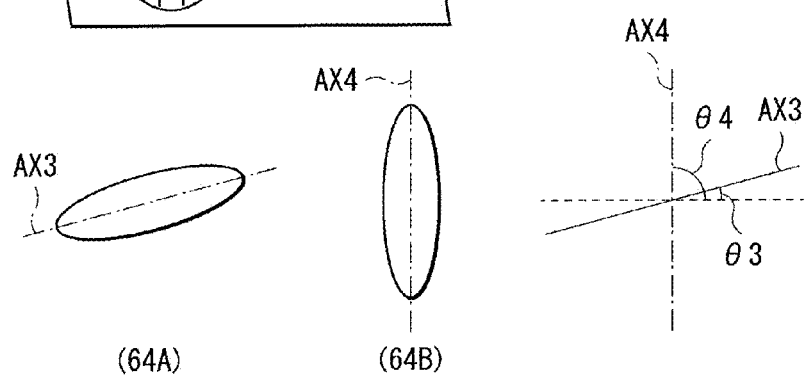
Figure 18C:
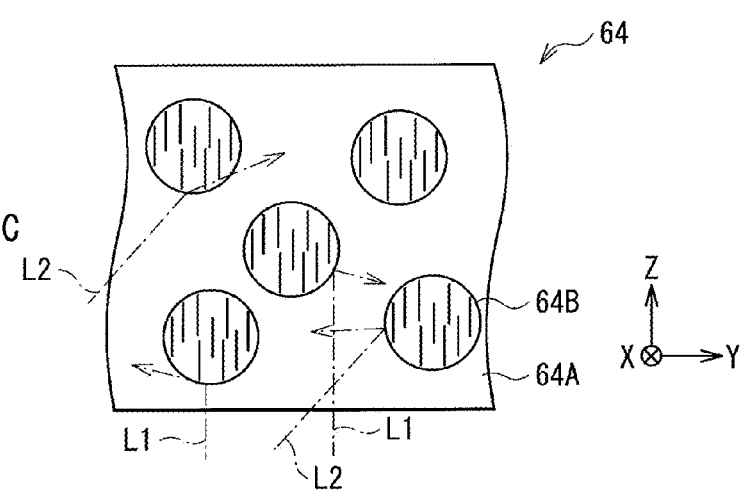

FIG. 18A schematically shows an example of an alignment state in the fine particles 64B when voltage is applied between the lower and upper electrodes 32 and 36. In FIG. 18A, an alignment state in the bulk 64A is omitted to be shown. FIG. 18B shows an example of an optical indicatrix showing refractive-index anisotropy of each of the bulk 64A and the fine particle 64B when voltage is applied between the lower and upper electrodes 32 and 36. FIG. 18C schematically shows an example of an aspect where light L1 going in a front direction and light L2 going in an oblique direction are scattered by the light modulation layer 64 when voltage is applied between the lower and upper electrodes 32 and 36.

The bulk 64A and the fine particle 64B are designed such that when voltage is not applied between the lower and upper electrodes 32 and 36, a direction of a light axis AX3 of the bulk 64A is equal (parallel) to a direction of a light axis AX4 of the fine particle 64B, for example, as shown in FIGS. 17A and 17B. The light axis AX3 or AX4 refers to a line parallel to a forward direction of a beam in which a refractive index has one value regardless of a polarization direction. A direction of the light axis AX3 and a direction of the light axis AX4 need not accurately correspond to each other, and may be somewhat different from each other due to, for example, manufacturing errors.

For example, the fine particle 64B is designed such that when voltage is not applied between the lower and upper electrodes 32 and 36, the light axis AX4 is parallel to a light incidence surface 10A of a light guide plate 10. Furthermore, for example, the fine particle 64B is designed such that when voltage is not applied between the lower and upper electrodes 32 and 36, the light axis AX4 intersects with the surface of the transparent substrate 31 or 37 at a slight angle θ3 (see FIG. 17B). The angle θ3 is described in detail in description of a material forming the fine particle 64B.

For example, the bulk 64A is designed such that the light axis AX4 is constant regardless of presence of voltage applied between the lower and upper electrodes 32 and 36.

Specifically, the bulk 64A is designed such that the light axis AX4 is parallel to the light incidence surface 10A of the light guide plate 10, and intersects with the surface of the transparent substrate 31 or 37 at a predetermined angle θ4, for example, as shown in FIGS. 17A and 17B and FIGS. 18A and 18B. In other words, the light axis AX3 of the bulk 64A is parallel to the light axis AX4 of the fine particle 64B in the case that voltage is not applied between the lower and upper electrodes 32 and 36.

The light axis AX4 need not accurately intersect with the surface of the transparent substrate 31 or 37 at the angle θ4 while being parallel to the light incidence surface 10A of the light guide plate 10, and may intersect with the surface at an angle slightly different from the angle θ4 due to, for example, manufacturing errors. The light axis AX3 or AX4 need not be accurately parallel to the light incidence surface 10A of the light guide plate 10, and may intersect with the light incidence surface 10A at a slight angle due to, for example, manufacturing errors.

Preferably, an ordinary refractive index of the bulk 64A is equal to an ordinary refractive index of the fine particle 64B, and an extraordinary refractive index of the bulk 64A is also equal to an extraordinary refractive index of the fine particle 64B. In this case, for example, when voltage is not applied between the lower and upper electrodes 32 and 36, refractive-index difference is substantially zero in all directions including front and oblique directions as shown in FIG. 17A, leading to a high light-transmitting property. Consequently, the light L1 going in a front direction and the light L2 going in an oblique direction are not scattered within the light modulation layer 64 and thus transmitted through the layer 64, for example, as shown in FIG. 17C. As a result, for example, as shown in FIGS. 9A and 9B, light L from the light source 20 (light in an oblique direction) is completely reflected at a boundary of a light-transmitting region 30A (an interface between the transparent substrate 31 or the light guide plate 10 and the air), and therefore luminance at the light-transmitting region 30A (luminance of black display) is decreased compared with a case where the light modulation element 60 is not provided (a dashed line in FIG. 9B).

For example, the bulk 64A and the fine particle 64B are designed such that when voltage is applied between the lower and upper electrodes 32 and 36, a direction of the light axis AX3 is different from (intersects with) a direction of the light axis AX4, as shown in FIG. 18A. For example, the fine particle 64B is designed such that when voltage is applied between the lower and upper electrodes 32 and 36, the light axis AX4 of the fine particle 64B is parallel to the light incidence surface 10A of the light guide plate 10, and intersects with the surface of the transparent substrate 31 or 37 at an angle θ4 (for example, 90°) larger than the angle θ3. The angle θ4 is described in detail in description of the material forming the fine particle 64B.

Thus, when voltage is applied between the lower and upper electrodes 32 and 36, refractive-index difference is large in all directions including front and oblique directions in the light modulation layer 64, leading to high light-scattering property. Consequently, the light L1 going in a front direction and the light L2 going in an oblique direction are scattered within the light modulation layer 64, for example, as shown in FIG. 18C. As a result, for example, as shown in FIGS. 9A and 9B, light L from the light source 20 (light in an oblique direction) passes through a boundary of the light-scattering region 30B (interface between the transparent substrate 31 or the light guide plate 10 and the air), and light transmitted to a reflective plate 40 side is reflected by the reflective plate 40, and then transmitted through the light modulation element 60. Therefore, luminance at the light-scattering region 30B is extremely high compared with a case where the light modulation element 60 is not provided (a dashed line in FIG. 9B), and besides luminance of partial white display (luminance enhancement) is increased in correspondence to decrease in luminance of the light-transmitting region 30A.

The ordinary refractive index of the bulk 64A may be somewhat different from the ordinary refractive index of the fine particle 64B due to, for example, manufacturing errors. For example, such difference is preferably 0.1 or less, and more preferably 0.05 or less. Similarly, the extraordinary refractive index of the bulk 64A may be somewhat different from the extraordinary refractive index of the fine particle 64B due to, for example, manufacturing errors. For example, such difference is preferably 0.1 or less, and more preferably 0.05 or less.

Refractive-index difference of the bulk 64A ($\Delta n_0$=extraordinary refractive index $n_1$-ordinary refractive index $n_0$) or refractive-index difference of the fine particle 64B ($\Delta n_1$=extraordinary refractive index $n_3$-ordinary refractive index $n_2$) is preferably as large as possible, which is preferably 0.05 or more, more preferably 0.1 or more, and still more preferably 0.15 or more. When refractive-index difference of each of the bulk 64A and the fine particle 64B is large, light-scattering ability of the light modulation layer 64 is improved, so that a light guide condition is easily broken, and consequently light is easily extracted from the light guide plate 10.

The bulk 64A and the fine particle 64B are different in response speed to an electric field. The bulk 64A has, for example, a streaky structure or porous structure being not responsive to an electric field, or a rod-like structure having a slower response speed than that of the fine particle 64B. The bulk 64A is formed of, for example, a polymer material obtained by polymerizing a low-molecular monomer. The bulk 64A is, for example, formed by polymerizing an alignable and polymerizable material (for example, monomer) by one or both of heat and light, the material being aligned along an alignment direction of the fine particle 64B or of the alignment film 33 or 35. For example, the streaky structure, the porous structure or the rod-like structure of the bulk 64A has a major axis in a direction that is parallel to the light incidence surface 10A of the light guide plate 10 and intersects with a surface of the transparent substrate 31 or 37 at a slight angle θ3. When the bulk 64A has the streaky structure, average striped-structure size in a minor axis direction is preferably 0.1 to 10 μm, and more preferably 0.2 to 2.0 μm from the viewpoint of increasing scattering of the guided light. From the viewpoint of decreasing wavelength dependence of scattering, average striped-structure size in a minor axis direction is preferably 0.5 to 5 μm, and more preferably 1 to 3 μm. Size of the streaky structure may be observed by a polarization microscope, a confocal microscope, an electron microscope or the like.

The fine particle 64B mainly includes, for example, a liquid crystal material, and thus has a response speed sufficiently faster than that of the bulk 64A. The liquid crystal material (liquid crystal molecules) contained in the fine particle 64B includes, for example, rod-like molecules. For example, liquid crystal molecules having positive dielectric anisotropy (so-called positive liquid crystal) are preferably used as the liquid crystal molecules contained in the fine particle 64B.

When voltage is not applied between the lower and upper electrodes 32 and 36, a major axis direction of each liquid crystal molecule is parallel to the light axis AX3 in the bulk 64A. Here, the major axis of the liquid crystal molecule in the fine particle 64B is parallel to the light incidence surface 10A of the light guide plate 10 and intersects with the surface of the transparent substrate 31 or 37 at a slight angle θ3. In other words, when voltage is not applied between the lower and upper electrodes 32 and 36, the liquid crystal molecule in the fine particle 64B is aligned with a tilt of the angle θ3 in a plane parallel to the light incidence surface 10A of the light guide plate 10. The angle θ3 is called pre-tilt angle, and, for example, preferably within a range of 0.1° to 30°. The angle θ3 is more preferably within a range of 0.5° to 10°, and still more preferably within a range of 0.7° to 2°. When the angle θ3 is increased, light-scattering efficiency tends to be reduced due to a reason described later. On the other hand, a too small angle θ3 causes variation of an azimuth at which a liquid crystal rises up upon voltage application. For example, a liquid crystal may rise up in a 180-degree opposite direction (reverse tilt). Consequently, refractive-index difference of each of the fine particle 64B and the bulk 64A may not be effectively used, and therefore light-scattering efficiency is reduced, and thus luminance tends to be reduced.

When voltage is applied between the lower and upper electrodes 32 and 36, the major axis direction of each liquid crystal molecule in the fine particle 64B intersects with (or is perpendicular to) the light axis AX3. Here, the major axis of the liquid crystal molecule in the fine particle 64B is parallel to the light incidence surface 10A of the light guide plate 10 and intersects with the surface of the transparent substrate 31 or 37 at an angle θ4 (for example, 90°) larger than the angle θ3. In other words, when voltage is applied between the lower and upper electrodes 32 and 36, each liquid crystal molecule in the fine particle 64B is aligned with a tilt of the angle θ4 or aligned standing at the angle θ4 (=90°) in the plane parallel to the light incidence surface 10A of the light guide plate 10.

Any monomer can be used as the alignable and polymerizable monomer as long as the monomer is optically anisotropic and mixable with the liquid crystal. In particular, a UV-curable low-molecular monomer is preferable in the modification. When voltage is not applied, a direction of optical anisotropy of the liquid crystal preferably corresponds to that of a polymerization product (polymer material) of the low-molecular monomer. Therefore, the liquid crystal and the low-molecular monomer are preferably aligned in the same direction before UV curing. In the case of using a liquid crystal for the fine particle 64B, when the liquid crystal includes rod-like molecules, a rod-like monomer material is preferably used. According to the above, a polymerizable and liquid-crystalline material is preferably used for the monomer material, and, for example, the material preferably has a polymerizable functional group being one or more functional group selected from functional groups consisting of an acrylate group, a methacrylate group, an acryloyloxy group, a methacryloyloxy group, a vinyl ether group, and an epoxy group. The functional groups may be polymerized by irradiating ultraviolet rays, infrared rays or an electron beam or by heating. A liquid-crystalline material having a multifunctional group may be added to suppress alignment reduction during UV irradiation. When the bulk 64A includes the streaky structure, a bifunctional liquid-crystalline monomer is preferably used as a material of the bulk 64A. A monofunctional monomer may be added to a material of the bulk 64A in order to adjust liquid-crystallinity exhibiting temperature, or tri- or multi-functional monomer may be added to the material in order to increase crosslink density.

In the modification, for example, voltage is applied to a pair of electrodes (lower electrode 32 and upper electrode 36) of each light modulation cell 30-1 such that the light axis AX4 of the fine particle 64B is parallel or approximately parallel to the light axis AX3 of the bulk 64A in a light modulation cell 30-1, and the light axis AX4 of the fine particle 64B intersects with or is perpendicular to the light axis AX3 of the bulk 64A in another light modulation cell 30-1. Consequently, light, which is emitted from the light source 20 and enters the light guide plate 10, is transmitted through the light-transmitting region 30A, where the light axis AX3 is parallel or approximately parallel to the light axis AX4, of the light modulation element 60. In contrast, light, which is emitted from the light source 20 and enters the light guide plate 10, is scattered by the light-scattering region 30B, where the light axis AX3 intersects with or is perpendicular to the light axis AX4, of the light modulation element 60. Among the scattered light, light passing through a bottom of the light-scattering region 30B is reflected by the reflective plate 40, and returned to the light guide plate 10, and then emitted from a top of the backlight 1. Among the scattered light, light going to a top of the light-scattering region 30B is transmitted through the light guide plate 10, and then emitted from the top of the backlight 1. In this way, in the modification, light is largely emitted from the top of the light-scattering region 30B while being substantially not emitted from a top of the light-transmitting region 30A. This increases modulation ratio in a front direction.

In the modification, since the bulk 64A and the fine particle 64B mainly include optically anisotropic materials, light-scattering is reduced and thus a light-transmitting property may be improved in an oblique direction. For example, when the bulk 64A and the fine particle 64B mainly include optically anisotropic materials being equal in ordinary refractive index and in extraordinary refractive index, directions of respective light axes of the bulk and the particle are equal or approximately equal in a region where voltage is not applied between the lower and upper electrodes 32 and 36. Consequently, refractive-index difference is reduced or eliminated in all directions including a front direction (normal direction of the light modulation element 60) and an oblique direction, leading to a high light-transmitting property. As a result, light leakage may be reduced or substantially eliminated over a wide view angle range, leading to improvement in view angle characteristic.

For example, when a liquid crystal having an ordinary refractive index of 1.5 and an extraordinary refractive index of 1.65 and a liquid-crystalline monomer having an ordinary refractive index of 1.5 and an extraordinary refractive index of 1.65 are mixed, and the liquid-crystalline monomer is polymerized while the liquid crystal and the liquid-crystalline monomer are aligned by an alignment film or by an electric field, a light axis of the liquid crystal corresponds to a light axis of a polymer formed through polymerization of the liquid-crystalline monomer. Consequently, refractive-index matching may be achieved in any direction. In such a case, a high light-transmitting state may be achieved, leading to further improvement in view angle characteristic.

In the modification, for example, as shown in FIGS. 9A and 9B, luminance at the light-transmitting region 30A (luminance of black display) is decreased compared with a case where the light modulation element 60 is not provided (a dashed line in FIG. 9B). On the other hand, luminance at the light-scattering region 30B is extremely high compared with a case where the light modulation element 60 is not provided (the dashed line in FIG. 9B), and besides luminance of partial white display (luminance enhancement) is increased in correspondence to decrease in luminance at the light-transmitting region 30A.

In the modification, the light axis AX4 of the fine particle 64B is parallel to the light incidence surface 10A of the light guide plate 10, and intersects with the surface of the transparent substrate 31 or 37 at a slight angle θ3 in a region where voltage is not applied between the lower and upper electrodes 32 and 36. In other words, liquid crystal molecules in the fine particle 64B are aligned with a tilt of the angle θ3 (with a pre-tilt angle) in a plane parallel to the light incidence surface 10A. Therefore, when voltage is applied between the lower and upper electrodes 32 and 36, each liquid crystal molecule in the fine particle 64B rises up in the plane parallel to the light incidence surface 10A instead of rising up in a random direction. Here, the light axes AX3 and AX4 of the bulk 64A and the fine particle 64B intersect with each other or are perpendicular to each other in the plane parallel to the light incidence surface 10A. Among light entering through the light incidence surface 10A of the light guide plate 10, light oscillating perpendicularly to the transparent substrate 31 is affected by difference between an extraordinary refractive index of the fine particle 64B and an ordinary refractive index of the bulk 64A. The difference between the extraordinary refractive index of the fine particle 64B and the ordinary refractive index of the bulk 64A is large, which increases scattering efficiency of light oscillating perpendicularly to the transparent substrate 31. In contrast, light oscillating parallel to the transparent substrate 31 is affected by difference between an ordinary refractive index of the fine particle 64B and an extraordinary refractive index of the bulk 64A. The difference between the ordinary refractive index of the fine particle 64B and the extraordinary refractive index of the bulk 64A is also large, which increases scattering efficiency of light oscillating parallel to the transparent substrate 31. Accordingly, light propagating through a region, where voltage is applied between the lower and upper electrodes 32 and 36, contains many oblique components. For example, when an acrylic light guide plate is used as the light guide plate 10, light propagates at an angle of 41.8° or more in the region where voltage is applied between the lower and upper electrodes 32 and 36. As a result, refractive-index difference is large in all directions including an oblique direction, and therefore a high light-scattering property may be obtained, leading to improvement in display luminance. In addition, display luminance may be more improved due to effects of the luminance enhancement.

Fifth Modification

Figure 19:
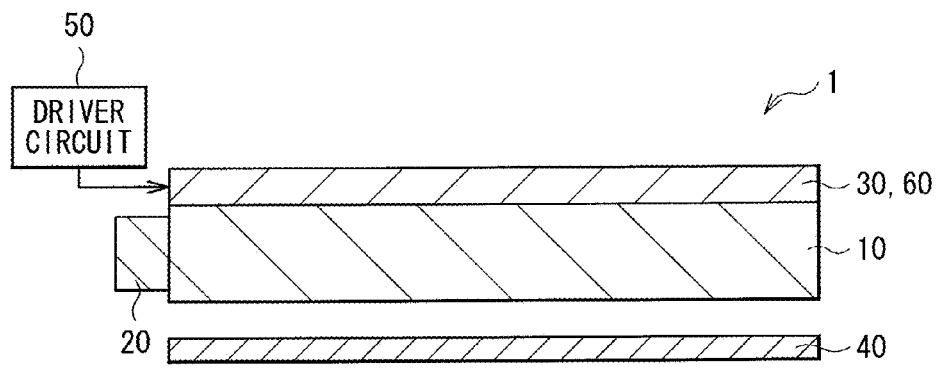
FIG. 19 is a section diagram showing still another example of a configuration of the backlight of FIG. 1A.
Figure 20:
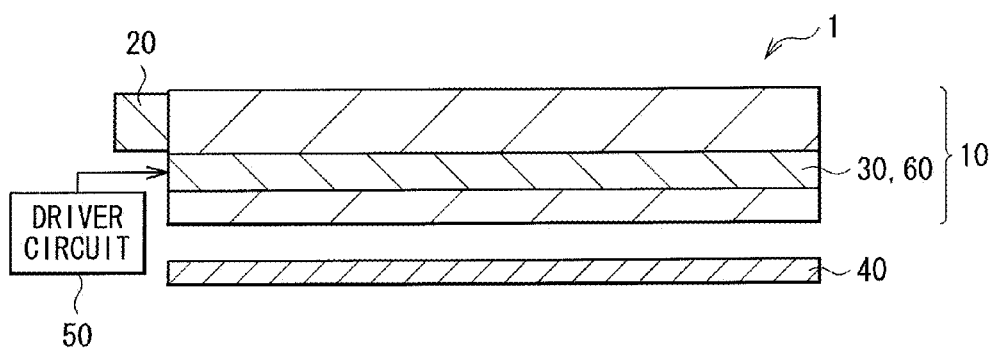
FIG. 20 is a section diagram showing still another example of a configuration of the backlight of FIG. 1A.

In the embodiment and the modifications, the light modulation element 30 or 60 is adherently bonded to the back (bottom) of the light guide plate 10 with no air layer in between. However, the element may be adherently bonded to a top of the light guide plate 10 with no air layer in between, for example, as shown in FIG. 19. The light modulation element 30 or 60 may be provided in the inside of the light guide plate 10, for example, as shown in FIG. 20. Even in such a case, the light modulation element 30 or 60 needs to be adherently bonded to the light guide plate 10 with no air layer in between.

Sixth Modification

Figure 21:
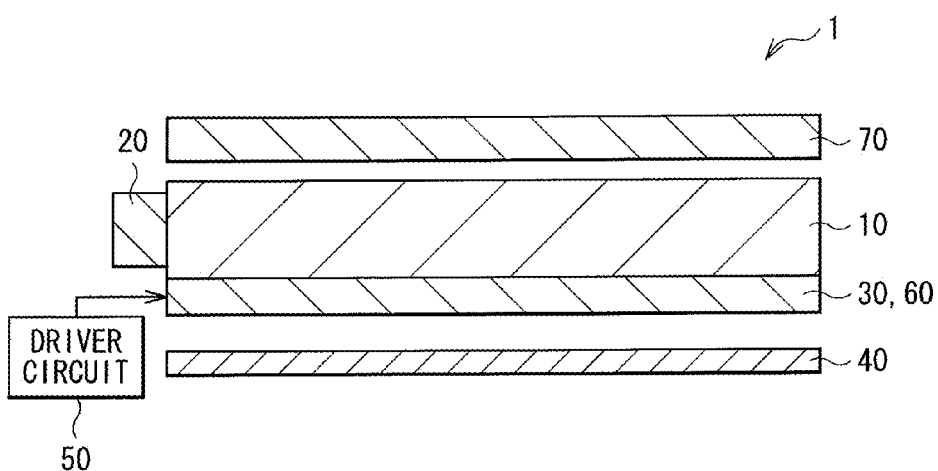
FIG. 21 is a section diagram showing still another example of a configuration of the backlight of FIG. 1A.

While no component is provided on the light guide plate 10 in the embodiment and the modifications, an optical sheet 70 (for example, a diffuser plate, a diffuser sheet, a lens film or a polarization separation sheet) may be provided thereon, for example, as shown in FIG. 21. In such a case, since part of light emitted in an oblique direction from the light guide plate 10 is directed to the front, a modulation ratio may be effectively improved. Furthermore, when a lens film is used, light is repeatedly reflected between the lens film and the lower reflective sheet, which is advantageous in blurring block boundaries.

Application Example

Next, an application example of the backlight 1 of each of the embodiment and the modifications is described.

Figure 22:
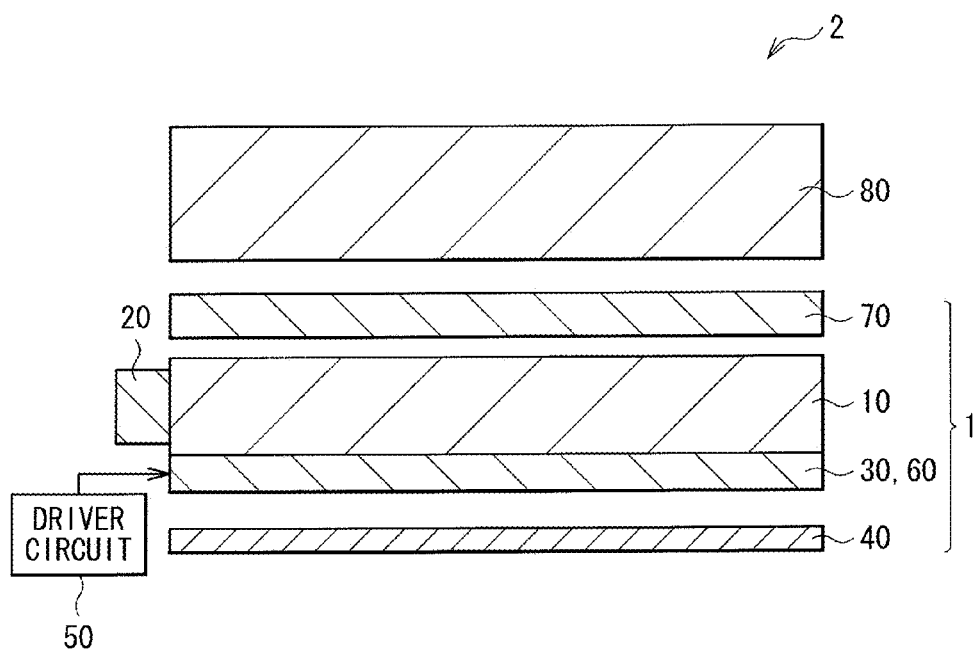
FIG. 22 is a section diagram showing an example of a display device according to an application example.

FIG. 22 shows an example of a schematic configuration of a display device 2 according to the application example. The display device 2 includes a liquid crystal display panel 80 (display panel) and a backlight 1 disposed behind the liquid crystal display panel 80.

The liquid crystal display panel 80 displays video images. The liquid crystal display panel 80 is, for example, a transmissive display panel including a liquid crystal layer sandwiched by a pair of transparent substrates, where pixels are driven according to a video signal. Specifically, the liquid crystal display panel 80 has a polarizer, a transparent substrate, pixel electrodes, an alignment film, a liquid crystal layer, an alignment film, a common electrode, a color filter, a transparent substrate, and a polarizer in this order from a backlight 1 side.

The transparent substrate includes a substrate transparent to visible light, for example, sheet glass. The transparent substrate on the backlight 1 side has an active driver circuit formed thereon, the circuit including TFTs (Thin Film Transistors) electrically connected to the pixel electrodes and wiring lines. The pixel electrodes and the common electrode include, for example, ITO. The pixel electrodes are lattice-arranged or delta-arranged on the transparent substrate, and act as electrodes for each of pixels. On the other hand, the common electrode is formed over the whole area on the color filter, and acts as a common electrode facing the respective pixel electrodes. The alignment film includes a polymer material such as polyimide for alignment treatment of a liquid crystal. The liquid crystal layer includes a liquid crystal of a VA (Vertical Alignment) mode, a TN (Twisted Nematic) mode or a STN (Super Twisted Nematic) mode, and has a function of changing, for each pixel, a direction of a polarization axis of light emitted from the backlight 1 in accordance with a voltage applied by the driver circuit (not shown). Arrangement of the liquid crystal is changed stepwise, thereby a direction of a transmission axis of each pixel is adjusted stepwise. The color filter includes color filters, which are arranged in correspondence to arrangement of the pixel electrodes, for color separation of light transmitted through the liquid crystal layer into, for example, three primary colors of red (R), green (G) and blue (B) or four colors of R, G, B and white (W). Filter arrangement (pixel arrangement) typically includes stripe arrangement, diagonal arrangement, delta arrangement, and rectangle arrangement.

Each polarizer is a kind of optical shutter, and transmits light (polarized light) in a certain oscillation direction. While the polarizer may be an absorption-type polarization element that absorbs light (polarized light) in oscillation directions other than a transmission axis direction, the polarizer is preferably a reflection-type polarization element, which reflects the light to a backlight 1 side, from the viewpoint of increase in luminance. The polarizers are disposed such that respective polarization axes are different by 90 degrees so that light emitted from the backlight 1 is transmitted through the liquid crystal layer or shut off.

The driver circuit 50 controls magnitude of voltage applied to a pair of electrodes (lower electrode 32 and upper electrode 36) of each light modulation cell 30-1. The driver circuit 50 controls magnitude of the voltage, for example, in such a manner that a light axis AX2 of a fine particle 34B is parallel to a light axis AX1 of a bulk 34A in a cell corresponding to a pixel position of black display among a plurality of light modulation cells 30-1, and the light axis AX2 intersects with the light axis AX1 in a cell corresponding to a pixel position of white display among the light modulation cells 30-1.

In the application example, the backlight 1 of each of the embodiment and the modifications is used as a light source for lighting the liquid crystal display panel 80. This may increase display luminance while light leakage is reduced or substantially eliminated over a wide view-angle range. As a result, a modulation ratio may be increased in a front direction. Moreover, luminance enhancement may be achieved without increasing input power to the backlight 1.

In the application example, the backlight 1 modulates intensity of light partially entering the liquid crystal display panel 80 in accordance with a display image. However, if drastic change of brightness occurs at a pattern edge portion of each electrode (lower electrode 32 or upper electrode 36) incorporated in the light modulation element 30 or 60, a boundary portion of the electrode may be inconveniently observed even on a display image. Thus, a characteristic, called blur characteristic, is demanded to change brightness monotonously to the utmost at an electrode boundary. A diffuser plate having high diffusibility is effectively used to enhance the blur characteristic. However, if diffusibility is high, total transmittance is reduced, and therefore brightness tends to be reduced. Therefore, when a diffuser plate is used for the optical sheet 70 in the application example, total transmittance of the diffuser plate is preferably 50% to 85%, and more preferably 60% to 80%. The blur characteristic is improved with increase in spatial distance between the light guide plate 10 and the diffuser plate in the backlight 1. Alternatively, the number of patterns of electrodes (lower electrodes 32 or upper electrodes 36) incorporated in the light modulation element 30 or 60 may be increased to adjust voltage of each electrode such that lightness or darkness is monotonously changed to the utmost.

In the application example, a brightness boundary portion of illumination light may be blurred, which may suppress degradation of image quality caused by an electrode pattern in the light modulation element 30 or 60. In the application example, when the brightness boundary portion of illumination light is blurred without adding a diffuser plate, further reduction in thickness may be achieved.

Examples

Hereinafter, examples of the invention are described. The following examples are described merely for illustration, and the invention is not limited to the examples.

Cell Preparation Method

A film substrate (PET) was used to prepare a liquid crystal cell (300×250 mm) in the following way. First, an ITO electrode was patterned by laser processing. Next, a polyamideimide solution was applied on the ITO film by a bar coater and dried at 80° C. for 10 min, and then such a coating was subjected to rubbing with a rubbing cloth. The rubbed alignment film was adhered to a light guide plate of 5 mm in thickness with an adhesion material. Furthermore, a solution (hereinafter, called monomer-mixed liquid crystal), including a liquid crystal, a UV-curable liquid-crystalline monomer, and a polymerization initiator, those being mixed into a predetermined composition, was dropped in the atmosphere on the ITO film with the light guide plate. Then, the ITO film was attached in a vacuum with a similarly-formed ITO film with an alignment film, so that a liquid crystal cell with a light guide plate was prepared.

A liquid crystal, having an ordinary refractive index of 1.513 and an extraordinary refractive index of 1.714 at 25° C. and a wavelength of 589 nm and having a nematic-to-liquid crystal phase transition temperature of 106° C., was used, and a bifunctional monomer, having an ordinary refractive index of 1.49 and an extraordinary refractive index of 1.64 at the same condition and having a nematic-to-liquid crystal phase transition temperature of 106° C., was used as the liquid-crystalline monomer. The liquid crystal and the liquid-crystalline monomer were mixed into a weight ratio of 90/10, and a polymerization initiator (N-1919 manufactured by ADEKA) corresponding to 1% by weight ratio of the liquid-crystalline monomer was added. Then, ultraviolet rays were irradiated to cure the liquid-crystalline monomer in the monomer-mixed liquid crystal.

Evaluation Method

1. Luminance Distribution

Light of white LED was irradiated from an edge portion of an end face of the prepared liquid crystal cell with a light guide plate. The white LED and a light modulation layer were disposed such that an incidence surface of the light guide plate for irradiating LED light was parallel to a rubbing direction, and the light modulation layer was located on a lower side. A white reflective plate was set on a bottom of the prepared cell with an air layer in between. In examples 1 to 3, voltage was applied to a particular portion of the cell so that light and dark regions were displayed in a plane. Here, a 240 Hz positive-and-negative pulse with 140 Vpp was applied to the light region of the cell. Furthermore, in the example 4, the voltage was applied to the particular portion of the cell, and a 240 Hz positive-and-negative pulse with 60 Vpp was applied to cells adjacent to the relevant cell to lighten the whole area in a plane. Furthermore, a diffuser sheet, a lens sheet (BEF), and a reflective polarization sheet (for example, DBEF (registered trademark of 3M) were set directly on the cell. Whether a brightness boundary portion was observed was determined by sensory evaluation during observation of the cell with a distance of 50 cm from the light guide plate, and furthermore an image of the cell as a whole was acquired by CCD (Charge Coupled Device). Furthermore, in-plane luminance distribution was measured by means of an in-plane luminance distribution meter "RISA COLOR" manufactured by HI-LAND. The following three combinations of optical sheets were prepared for measurement.

1. Diffuser sheet/lens sheet/reflective polarization sheet.
2. Two Diffuser sheets/lens sheet/reflective polarization sheet.
3. Diffuser plate/lens sheet/reflective polarization sheet.

Example 1

In a light guide plate of 300 by 250 mm, ITO electrodes were patterned such that divided blocks of 75 by 83 mm were arranged into a 4×3 matrix. Here, each block boundary portion of an upper (light-emission-side) ITO electrode was formed into a zigzag shape including a linear edge as shown in FIG. 3A, and each block boundary portion of a lower ITO electrode was formed to be linear. The formed zigzag shape was measured, as a result, the shape had a pitch of 2 mm, length of 30 mm, and a length of an end portion of 30 μm.

The light modulation layer having the ITO electrodes were used to prepare a cell according to the above, and the prepared cell was evaluated.

Example 2

ITO electrodes were patterned in the same way as in the example 1 except that a profile of each convex portion in an irregular shape of each block boundary portion of an upper (light-emission-side) ITO electrode was a function of the power of 2 of the sine as shown in FIG. 13, so that a cell was prepared and evaluated.

Example 3

ITO electrodes were patterned in the same way as in the example 1 except that a profile of each convex portion in an irregular shape of each block boundary portion of an upper (light-emission-side) ITO electrode was a function of the power of 2 of the sine as shown in FIG. 14B, so that a cell was prepared and evaluated. The ITO electrodes were patterned in such a manner that ends of the convex portions were arranged with a space of 2 mm in a zigzag pattern.

Example 4

ITO electrodes were patterned in the same way as in the example 1 except that a profile of each convex portion in an irregular shape of each block boundary portion of an upper (light-emission-side) ITO electrode was a function of the power of 2 of the sine as shown in FIG. 13, so that a cell was prepared, and the cell was evaluated while voltage was applied even to an adjacent block.

Comparative Example 1

ITO electrodes were patterned in the same way as in the example 1 except that a profile of each block boundary portion of an upper (light-emission-side) ITO electrode is linear, so that a cell was prepared and evaluated.

Figure 23A:
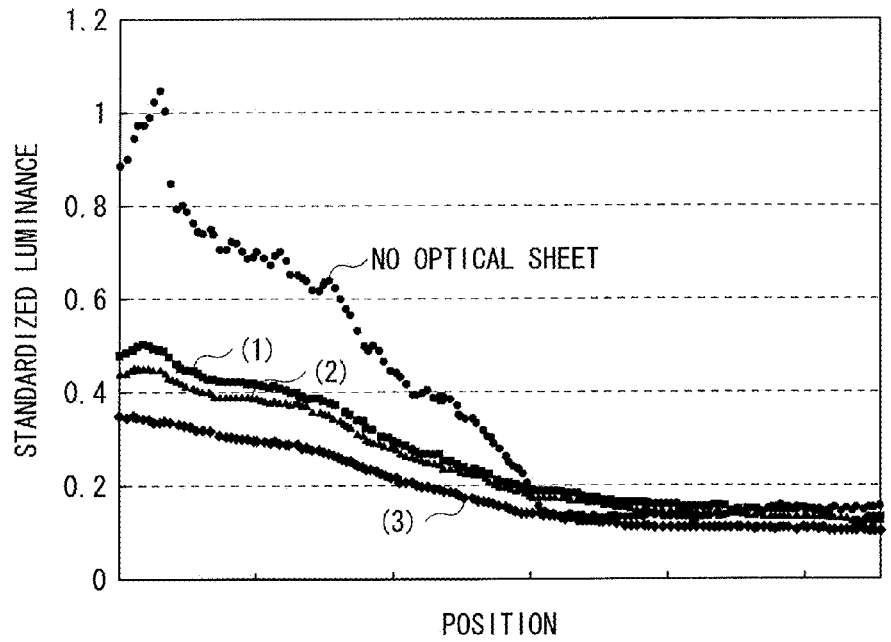
FIGS. 23A and 23B are graphs showing luminance distribution of backlights according to examples and a comparative example.
Figure 23B:
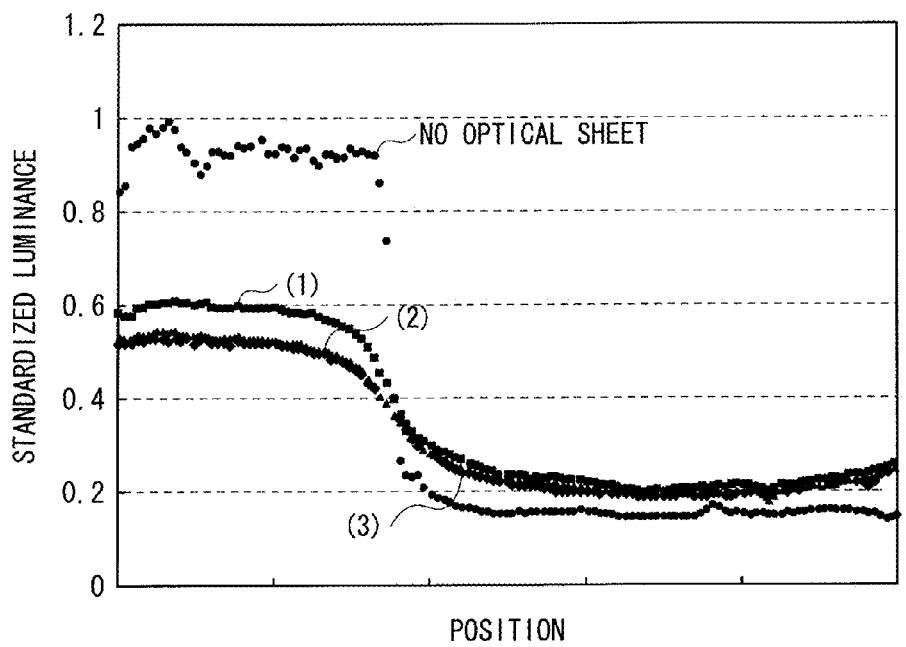

FIG. 23A shows a measurement result of in-plane luminance distribution of the example 1 with no optical sheet on a light modulation layer and measurement results of in-plane luminance distribution with the optical sheet 1, 2 and 3, respectively. In any case of the optical sheets 1, 2 and 3, a boundary portion between light and dark regions was not observed. FIG. 23B shows a measurement result of in-plane luminance distribution of the comparative example 1 with no optical sheet on a light modulation layer and measurement results of in-plane luminance distribution with the optical sheet 1, 2 and 3, respectively. In this case, in any case of the optical sheets 1, 2 and 3, a boundary portion between light and dark regions was observed, showing a difficulty for video display.

In FIGS. 24A to 24E, right figures show measurement results of in-plane luminance distribution with the optical sheet 1 on the respective light modulation layers of the examples 1 to 4 and the comparative example 1. In FIGS. 24A to 24E, left figures show measurement results of in-plane luminance distribution with no optical sheet on the respective light modulation layers of the examples 1 to 4 and the comparative example 1. FIG. 24A shows a result with the light modulation layer of the comparative example 1, FIG. 24B shows a result with the light modulation layer of the example 1, FIG. 24C shows a result with the light modulation layer of the example 2, FIG. 24D shows a result with the light modulation layer of the example 3, and FIG. 24E shows a result with the light modulation layer of the example 4. As shown in FIGS. 24A to 24E, a boundary portion is more unclear in the example 2 compared with the example 1, showing improvement in blur characteristic. Furthermore, the blur characteristic is high in the example 3 compared with the example 2. The blur characteristic is high in the example 4 compared with any other examples.

The present application contains subject matter related to that disclosed in Japanese Priority Patent Application JP 2010-088173 filed in the Japan Patent Office on Apr. 6, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalent thereof.

What is claimed is:
1. A lighting device comprising:
    a light guide plate;
    a light source disposed on a side face of the light guide plate; and
    a light modulation element disposed on a surface of or inside the light guide plate, and adhered to the light guide plate,
    wherein the light modulation element has a pair of transparent substrates disposed separately and oppositely, a first electrode provided on a surface of one of the pair of transparent substrates, a second electrode provided on a surface of the other of the pair of transparent substrates, and a light modulation layer, provided in a gap between the pair of transparent substrates, wherein a portion of the light modulation layer is configured to exhibit a light-scattering property and a light-transmitting property with respect to light from the light source,
    wherein a degree of light scattering or light-transmission in the portion of the light modulation layer depends on an intensity of an electric field in the portion of the light modulation layer,
    wherein one or both of the first electrode and the second electrode include a plurality of partial electrodes, and
    wherein first partial electrodes of the plurality of partial electrodes are adjacent to second partial electrodes of the plurality of partial electrodes, and have irregular shapes on edges adjacent to the second partial electrodes.
2. The lighting device according to claim 1, wherein the irregular shape is a zigzag shape, a waveform shape, a trapezoidal shape, a ramp shape or a random shape.
3. The lighting device according to claim 1,
    wherein the irregular shape is a zigzag shape with a plurality of first convex portions, having acute ends, being arranged, and
    wherein one or more of profiles of the first convex portions are roughly sinusoidal.
4. The lighting device according to claim 1, wherein the second partial electrodes have irregular shapes on edges adjacent to the first partial electrodes.
5. The lighting device according to claim 4, wherein the irregular shape of the second partial electrode is a zigzag shape, a waveform shape, a trapezoidal shape, a ramp shape or a random shape.
6. The lighting device according to claim 4,
    wherein the irregular shape of the second partial electrode is a zigzag shape with a plurality of second convex portions, having acute ends, being arranged, and wherein one or more of profiles of the second convex portions are roughly sinusoidal.

7. The lighting device according to claim 4,
wherein the plurality of partial electrodes are arranged in a matrix, and
wherein each partial electrode has an irregular shape on an edge adjacent to another partial electrode.

8. The lighting device according to claim 4,
wherein the irregular shape of the first partial electrode includes a plurality of first convex portions arranged along an edge, and
wherein the irregular shape of the second partial electrode includes a plurality of second convex portions arranged along an edge, and
wherein the plurality of first convex portions and the plurality of second convex portions are alternately arranged.

9. The lighting device according to claim 8, wherein an end of each first convex portion is located within a concave portion formed between adjacent two second convex portions.

10. The lighting device according to claim 8, wherein an end of each first convex portion is located outside a concave portion formed between adjacent two second convex portions.

11. The lighting device according to claim 8, wherein ends of one or both of the first convex portions and the second convex portions are unevenly arranged.

12. The lighting device according to claim 8, wherein ends of one or both of the first convex portions and the second convex portions are alternately arranged.

13. The lighting device according to claim 8, wherein ends of one or both of the first convex portions and the second convex portions are randomly arranged.

14. The lighting device according to claim 1, wherein edges, adjacent to the first partial electrodes of the second partial electrodes are linear.

15. The lighting device according to claim 1,
wherein among the plurality of partial electrodes, a third partial electrodes, adjacent to the first partial electrodes via the second partial electrodes, have irregular shapes on edges adjacent to the first partial electrodes via the second partial electrodes, and
wherein the second partial electrodes extend in accordance with the irregular shapes on the edges of the first partial electrodes and with the irregular shapes on the edges of the third partial electrodes.

16. The lighting device according to claim 15 further comprising a power supply applying voltage to the light modulation element, wherein:
the power supply applies voltage to the first partial electrodes, the second partial electrodes and the third partial electrodes such that the following expression is satisfied, $$V1 > V2 > V3,$$

V1: voltage applied to the first partial electrodes by the power supply,
V2: voltage applied to the second partial electrodes by the power supply, and
V3: voltage applied to the third partial electrodes by the power supply.

17. A display device comprising:
a display panel having a plurality of pixels arranged in a matrix, the pixels being driven based on an image signal, and
a lighting device lighting the display panel, wherein the lighting device includes:
a light guide plate,
a light source disposed on a side face of the light guide plate, and
a light modulation element disposed on a surface of or inside the light guide plate, and adhered to the light guide plate,
wherein the light modulation element has a pair of transparent substrates disposed separately and oppositely, a first electrode provided on a surface of one of the pair of transparent substrates, a second electrode provided on a surface of the other of the pair of transparent substrates, and a light modulation layer, provided in a gap between the pair of transparent substrates, wherein a portion of the light modulation layer is configured to exhibit a light-scattering property and a light-transmitting property with respect to light from the light source, wherein a degree of light scattering or light-transmission in the portion of the light modulation layer depends on an intensity of an electric field in the portion of the light modulation layer,
wherein one or both of the first electrode and the second electrode include a plurality of partial electrodes, and
wherein first partial electrodes of the plurality of partial electrodes are adjacent to second partial electrodes of the plurality of partial electrodes, and have irregular shapes on edges adjacent to the second partial electrodes.

18. The lighting device of claim 1, wherein the light modulation element is configured to provide the light from the light source to a plurality of pixels.

19. The lighting device of claim 1, wherein a portion of the light modulation element is configured to reflect the light from the light source into the light guide plate when a voltage is not applied between the first and second electrodes, and wherein the portion of the light modulation element is configured to transmit the light from the light source to a plurality of pixels when a voltage is applied between the first and second electrodes.

20. The lighting device of claim 1, wherein a portion of the light modulation element is configured to reflect the light from the light source into the light guide plate when the portion of the light modulation element exhibits the light-transmitting property, and wherein the portion of the light modulation element is configured to transmit the light from the light source to a plurality of pixels when the portion of the light modulation element exhibits the light-scattering property.

* * * * *